United States Patent [19]

Hatch et al.

[11] Patent Number: 5,208,712
[45] Date of Patent: * May 4, 1993

[54] DATA HEAD LOAD BEAM FOR HEIGHT COMPACTED, LOW POWER FIXED HEAD AND DISK ASSEMBLY

[75] Inventors: Michael R. Hatch, Palo Alto; William G. Moon, Saratoga, both of Calif.

[73] Assignee: Quantum Corporation, Milpitas, Calif.

[ * ] Notice: The portion of the term of this patent subsequent to Jun. 25, 2008 has been disclaimed.

[21] Appl. No.: 717,038

[22] Filed: Jun. 18, 1991

Related U.S. Application Data

[63] Continuation of Ser. No. 610,306, Nov. 6, 1990, Pat. No. 5,027,241, which is a continuation of Ser. No. 491,748, Mar. 12, 1990, abandoned, which is a continuation of Ser. No. 362,031, Jun. 1, 1989, abandoned.

[51] Int. Cl.⁵ .......................... G11B 5/54; G11B 21/22
[52] U.S. Cl. ................................. 360/98.01; 360/105
[58] Field of Search .......................... 360/105, 98.01

[56] References Cited

U.S. PATENT DOCUMENTS

| | | | |
|---|---|---|---|
| 3,646,536 | 2/1972 | Bleiman | 340/174.1 C |
| 3,772,666 | 11/1973 | Scholz et al. | 340/174.1 C |
| 3,984,873 | 10/1976 | Pejcha | 360/105 |
| 4,017,898 | 4/1977 | Toombs et al. | 360/105 |
| 4,167,765 | 9/1979 | Watrous | 360/103 |
| 4,204,235 | 5/1980 | Stollorz | 360/103 |
| 4,398,228 | 8/1983 | Bauck | 360/77.02 |
| 4,535,374 | 8/1985 | Anderson et al. | 360/103 |
| 4,605,979 | 8/1986 | Inoue | 360/105 |
| 4,639,798 | 1/1987 | Harrison et al. | 360/73.03 |
| 4,661,873 | 4/1987 | Schulze | 360/105 |
| 4,669,004 | 5/1987 | Moon et al. | 360/77 |
| 4,670,804 | 6/1987 | Kant et al. | 360/102 |
| 4,703,376 | 10/1987 | Edwards et al. | 360/105 |
| 4,783,705 | 11/1988 | Moon et al. | 360/77.07 |
| 4,787,000 | 11/1988 | Schulze | 360/105 |
| 4,796,122 | 1/1989 | Levy et al. | 360/98.01 |
| 4,797,763 | 1/1989 | Levy et al. | 360/104 |
| 4,807,054 | 2/1989 | Sorenson et al. | 360/104 |
| 4,853,811 | 8/1989 | Brooks et al. | 360/103 |
| 4,933,785 | 6/1990 | Morehouse et al. | 360/78.04 |
| 5,005,089 | 4/1991 | Thanos et al. | 360/77.08 |

*Primary Examiner*—Robert S. Tupper
*Attorney, Agent, or Firm*—David B. Harrison

[57] ABSTRACT

A data transducer head mounting structure for a height compacted, low power head and disk assembly of a fixed disk data storage subsystem has an elongated load beam including a head arm attachment end region for attachment to an outward end of an actuator head arm; a leaf spring loading region; flexure attachment region for attachment of a gimbal flexure for mounting a transducer head; a dynamic loading tab formed at the outermost part of the head end region beyond the transducer head; and, a load beam region located between the leaf spring loading region and the dynamic loading tab. In one aspect of the invention a loading ramp structure is positioned adjacent to a peripheral edge of the storage disk and cooperates with the dynamic loading tab. In one independent aspect of the present invention, the load beam region includes two L-shaped flanges facing toward an adjacent data storage surface, and a trussing structure is attached to the outer surfaces of the flanges to enclose the load beam region. In a further aspect, the leaf spring loading region including two parallel outer segments defining a central longitudinal opening which are dimensioned to tune torsional mode resonances while maintaining a predetermined head loading bias force.

12 Claims, 18 Drawing Sheets

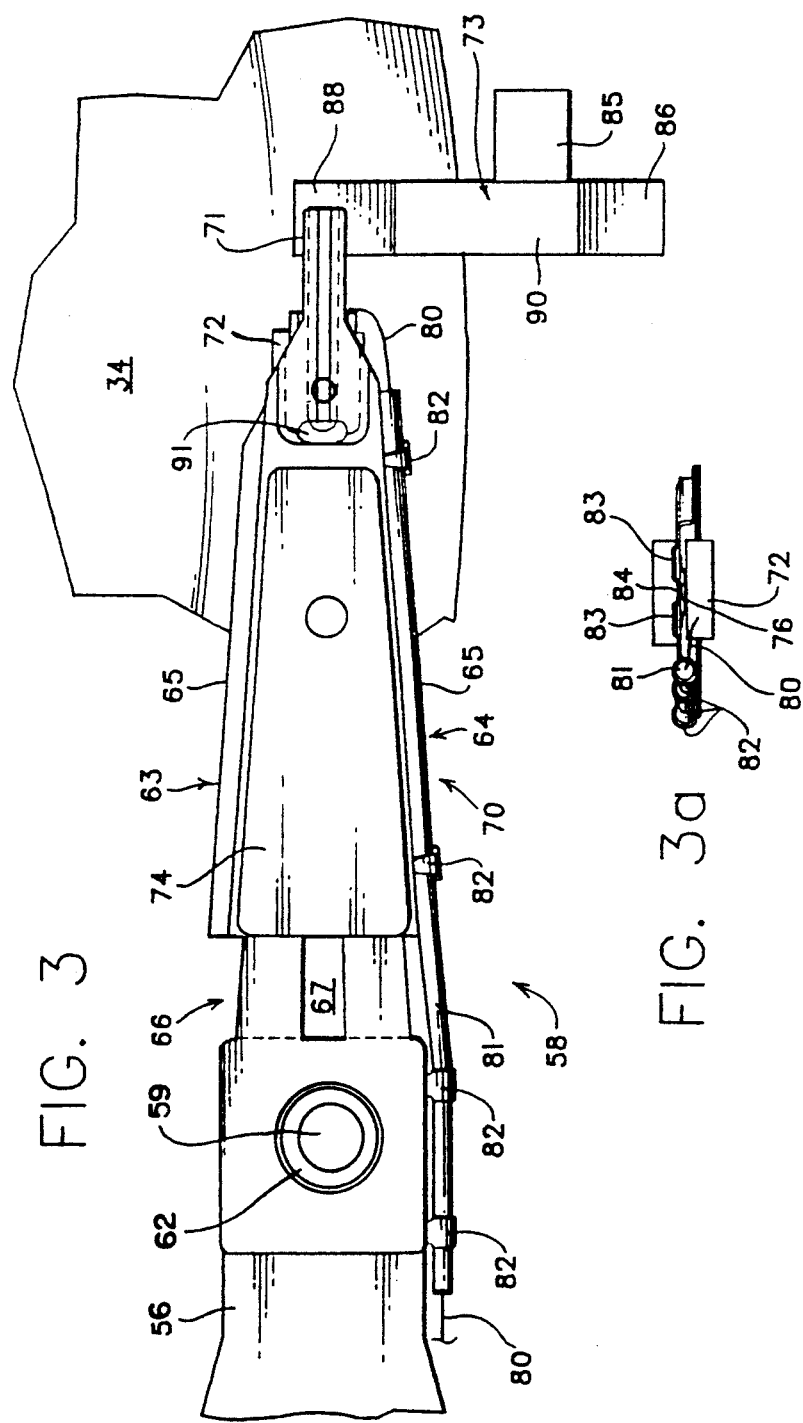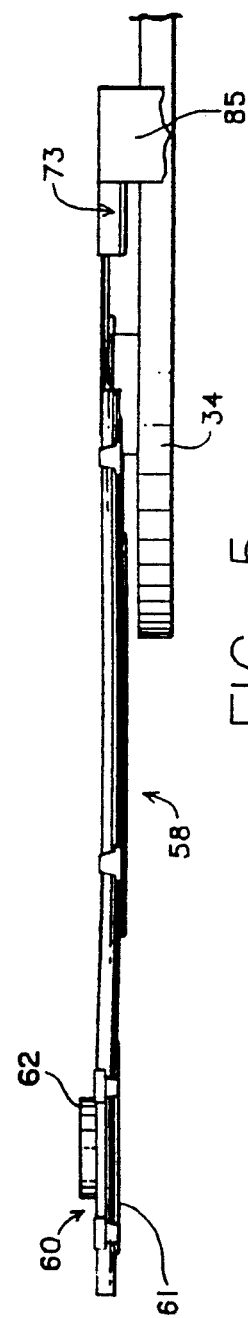

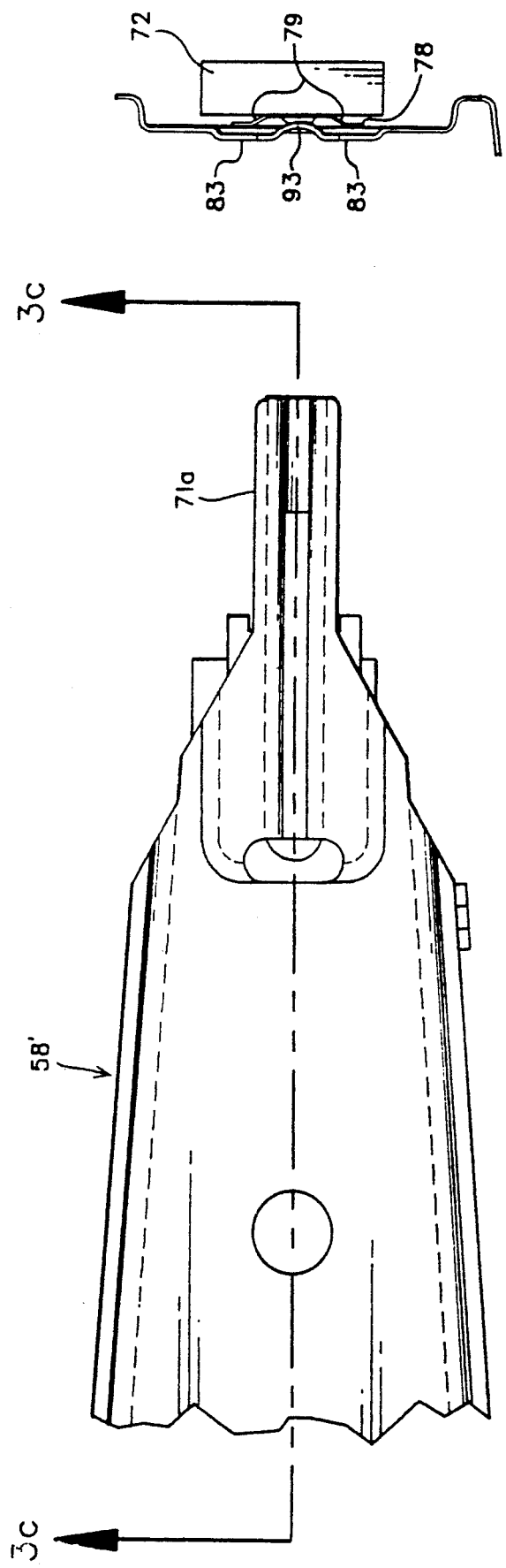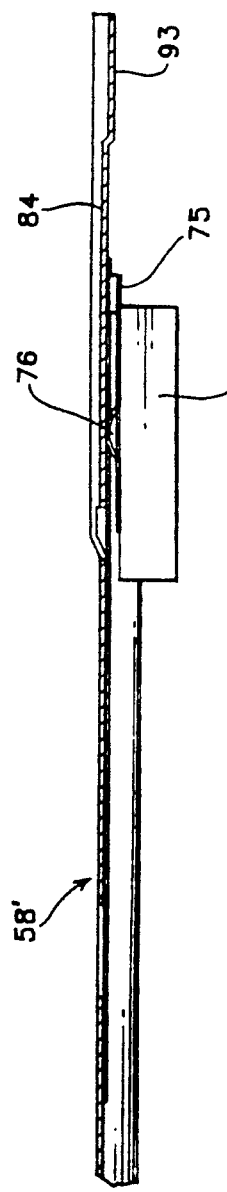
FIG. 3d
FIG. 3b
FIG. 3c

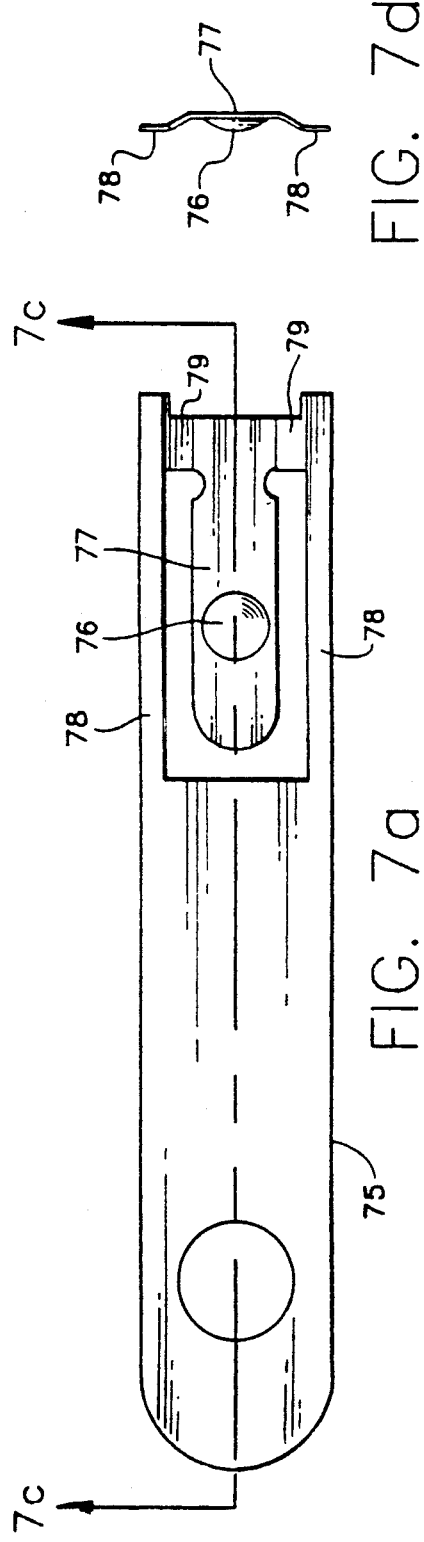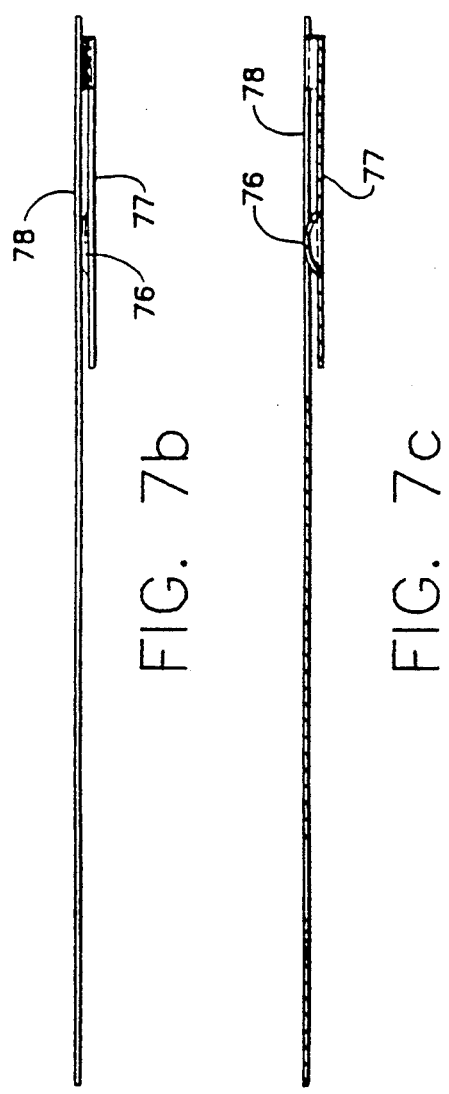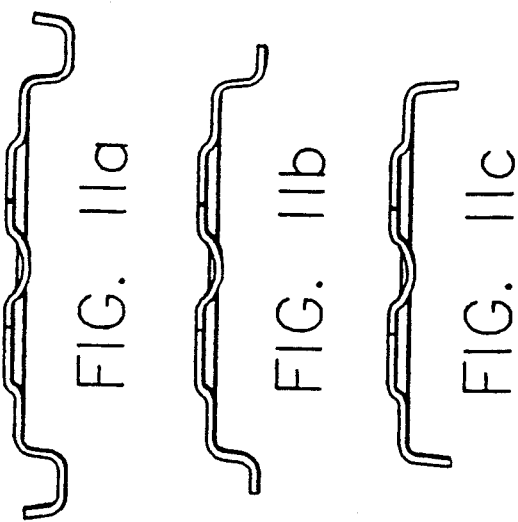

DESIGN 1 — FULL WRAPPED FLANGES

DESIGN 2 — VERTICAL AND HORIZONTAL FLANGES

DESIGN 3 — VERTICAL FLANGES ONLY

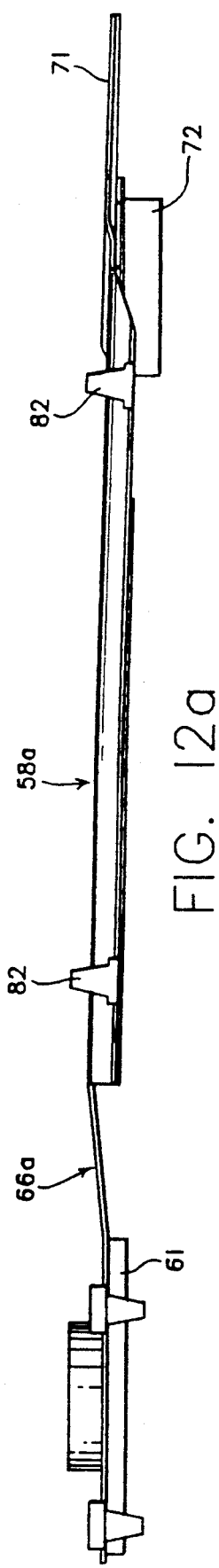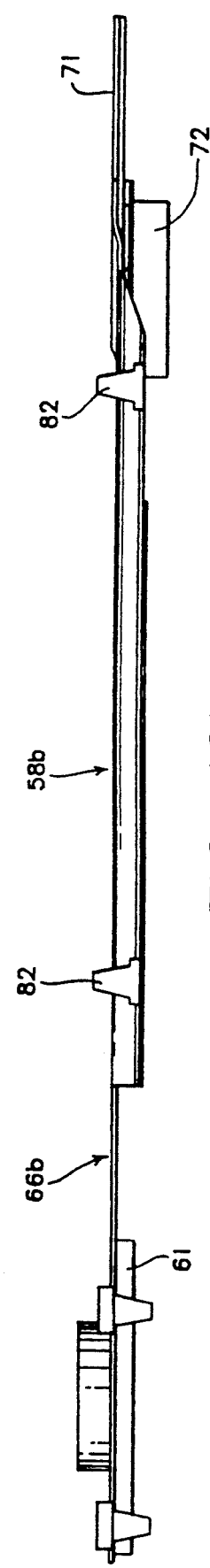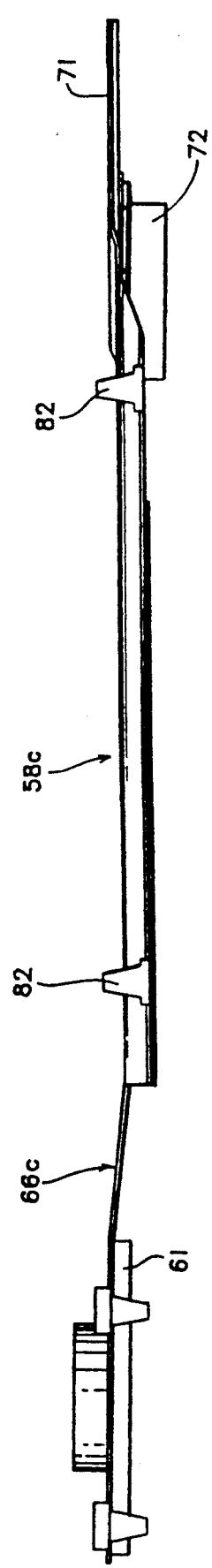

DATA HEAD LOAD BEAM FOR HEIGHT COMPACTED, LOW POWER FIXED HEAD AND DISK ASSEMBLY

REFERENCE TO RELATED APPLICATION

The present application is a continuation of U.S. Pat. application Ser. No. 07/610,306 filed on Nov. 6, 1990, now U.S. Pat. No. 5,027,241, which is a continuation of U.S. Pat. application Ser. No. 07/491,748 filed on Mar. 12, 1990, now abandoned, which is a continuation in part of U.S. Pat. application Ser. No. 07/362 031, filed on Jun. 1, 1989, now abandoned.

FIELD OF THE INVENTION

The present invention relates to height-compacted head and disk assemblies for low power, miniature fixed disk drives. More particularly, the present invention relates to improved data transducer head mounting structure ("load beam") configurations which enable realization of a miniature, high storage capacity, low power fixed disk drive; closer disk-to-disk spacing (height compaction) within the drive than heretofore achievable; increased stiffness and resistance to vibrational modes; and, improved head loading and unloading relative to the disk data storage surface during manufacturing and/or during use of the drive.

BACKGROUND OF THE INVENTION

Disk drive data storage subsystems have evolved from very large peripheral devices having large rotating data storage disks and hydraulic head positioning mechanisms into disk drives having very small, fully enclosed packages for inclusion entirely within the housing of small computing systems, such as personal computers and work stations. Concomitantly, non-removable storage disk diameters have progressed inwardly from e.g. 24 inches to as small as two and one half inches, with corresponding dimensional reductions in overall disk drive packages Overall external package height, width and length dimensions of a disk drive package have come to be referred to in the disk drive art by a single expression, "form factor" The term "form factor" means the external dimensional outline required for the disk drive subsystem including its on-board control electronics. While disk drive form factors including disk diameters have progressively shrunk, e.g. from 14 inch, to eight inch, to five and one quarter inch, to three and one half inch, to two and one half inch disk diameter based packages, the aerial data storage density at the data surface of the storage disk has increased dramatically as has the large scale integration of control electronics. Physically very small disk drives of the present time thus provide the same or greater user data storage capacity than characterized much larger disk drives of a few years ago.

Contemporary disk drives typically include at least one rotating data storage disk and a head positioner for positioning a data transducer head among multiple concentric data storage tracks on the data surface of the disk. Data storage capacities are conventionally increased by providing ganged multiple heads and commonly journalled multiple disks rotating about a central axis. Increased data track densities have been achieved by head positioning servo techniques which have promoted head alignment with the data storage track irrespective of dimensional changes brought on by thermal shifts within the disk drive package.

In some prior disk drives, a dedicated servo surface has been provided with factory recorded concentric servo tracks which are followed by a servo head. While servo surface technology has enabled significant increase in the number of data track locations (cylinders), the drawback has been the high cost of dedicating an entire disk surface to servo information and providing a separate servo read head and channel to the head position servo function.

Another approach pioneered by the assignee of the present invention has been to have a head positioner servo loop with an optical position transducer tightly coupled to a rotary head positioner actuator structure and also provide thermal correction information on one or more data surfaces of the disk. One example of a disk drive in accordance with this approach is to be found in commonly assigned U.S. Pat. No. 4,639,798. Another example of this type of disk drive architecture is provided by commonly owned U.S. Pat. application Ser. No. 07/192,353, filed on May 10, 1988, now U.S. Pat. No. 5,005,089.

Another prior approach to head positioning has been to embed servo information within each physical block storage location or "sector" of the data storage format on each data storage surface. One example of embedded sector servo information within a disk drive is described in commonly owned U.S. Pat. No. 4,669,004, the disclosure of which is hereby incorporated by reference. Data sectors carrying embedded servo information provide a number of advantages over other positioner systems. These advantages flow basically from the fact that the data head reading the data of interest also reads head position correction information and passes that information through the same read channel as the data. Thus, there will not be positional offsets or discrepancies as may occur between a data surface and data head, and a servo surface and servo head.

While embedded servo information within data block sectors overcomes the drawback of the dedicated servo surface approach, and may provide for increased track densities over the optical positioner architecture noted above, one drawback of sectorized, embedded servo information is that of susceptibility of the sampled data servo loop to mechanical vibrations. The embedded sector based servo loop typically samples the embedded servo information at a sampling rate which may be or become very sensitive to interferences from mechanical vibrations within the head positioning structure. Care must be given in the design of the disk drive to head positioner resonances in order to avoid interference with the operation of the sampled data servo loop.

As taught by the Banck U.S. Pat. No. 4,398,228, for example, it is theoretically desireable to tune or adjust head arm resonance to the servo sample rate which has an inherent notch in transfer function The notch at the sampling rate thereby cancels the disturbance of the head arm resonance and provides a stabilized servo loop response. There are several practical drawbacks to the Banck approach First, the Banck disclosure did not provide any practical suggestions as to how to tune a head arm positioner structure of a fixed disk drive in order to make its resonance(s) coincide with the sampling rate. Moreover, the Banck disclosure did not recognize that with a fixed disk head positioner structure, there may be more than one head positioner resonance and mode (including torsional, bending, and lateral modes of vibration), and that the modes and resonance frequencies thereof occur at different frequencies. Also, as noted by Banck, head arm resonance at or near the zero dB crossing of the servo loop bandwidth, or a resonant frequency which is an integral multiple of one half of the sampling frequency above the servo bandwidth zero dB crossing, can lead to servo loop instabilities through "aliasing", i.e., high frequency resonance appearing in the base-band frequency range which is from zero to one half the sampling rate.

Thus, with embedded sector servo control systems for head positioning, a hitherto unsolved need has arisen for a mechanism for not only strengthening the positioner structure for the head, but also providing a number of selectable configurations so that interfering resonances, whether within the servo loop bandwidth or aliases, may be adjusted to minimize disturbance of the positioner system.

As disk drives have matured, disk drive form factors have tended to become standardized within the computer industry, so that makers of computers may obtain disk drives from a variety of sources which will fit within a well or space in the computer designed to accomodate a fixed disk drive of a given form factor. This way, data storage devices including disk drives, and perhaps tape backup drives for example, having a range of features, capacities and performance characteristics may be installed and used within a given family of computers.

With a standardized form factor as a controlling constraint in designing new disk drives, a hitherto unsolved problem has arisen in designing miniature disk drives having more than just a few disks. In such miniature disk drives, limited angular displacement, direct drive rotary actuators have been proposed and widely used, see commonly assigned U.S. Pat. No. 4,783,705, and the above-referenced U.S. Pat. No. 4,669,004, for example, which illustrate one practical form of in-line actuator structure. Such actuators which include ganged, comb-like extensions for connecting and supporting the head arms, flexures and heads, have been realized with lower mass and with higher track seeking movement velocities which achieve improved track access characteristics.

With linear actuator structures, it has been possible to conserve headroom between disks by laterally offsetting adjacently opposed heads and supporting structures. However, with commonly ganged rotary head mounting structures, the heads must remain in vertical registration to maximize capacity by allowing a larger data band and minimizing the space needed for a head landing zone for parking the heads on the data surface in the absence of the air bearing provided by disk rotation. With a rotary voice coil actuator structure heretofore there simply hasn't been enough room to fit many disks closely together on a single spindle for rotation about a common axis and concomitantly provide sufficient stiffness within the head positioner structure for effective head positioning. This limitation has arisen on account of the spacing or distance required between the disks in order to accomodate the vertically aligned heads and head mounting structures of the ganged head positioner assembly Heretofore, a minimum spacing was required between each oppositely facing data surface of two adjacent disks in order to have enough room for the two heads (sometimes called sliders) and the suspension, load beam and head arm associated with each head.

Another and related limitation concerns the limited amount of torque available at the spindle to rotate the heads. As disk drives progressed to the five and one quarter inch diameter form factor in both full height and half height configurations, standard practice evolved to include a direct drive spindle motor as a part of the disk spindle assembly. As disk drive form factors have progressed to the three and one half inch diameter and the two and one half inch diameter form factors, where three or more disks have been used, the spindle motor has typically been included entirely within the spindle hub at the central region of the disk track. Generally speaking, the torque generated by a direct drive, brushless spindle motor has been a function of the radius to the rotating magnet assembly. With the rotating magnets included within the radial constraints of the spindle hub, these "in the hub" spindle motors generally develop less torque than other spindle motor designs not constricted by the hub cross dimension.

Prior fixed disk drives having non-removable media have typically provided lubricated or carbon-overcoated disk data storage surfaces, so that the head slider could take off and land on the disk surface as the disk began to rotate on power-up, and ceased to rotate on power-down. With the slider in contact with the data surface, starting friction or "stiction" has required much greater spindle torque than the torque required merely to rotate the disks once the head sliders are "flying" on an air bearing. With the addition of heads and disk surfaces to increase data storage capacity, the stiction torque requirements have progressively increased, while the "in the hub" motor size has stayed constant or decreased, in order to maintain the form factor required by the computer industry.

Stiction within a disk drive having direct head-disk surface contact is a function of several characteristics including contamination within the enclosed space of the head-disk assembly and surface condition of the disk (and slider). In essence, a disk drive having direct head-disk contact is a very sensitive sensor for the presence of contaminants, whether due to out-gassing pf components, or leakages of lubricants from the disk spindle or the actuator assembly, etc. No mass produced disk drive is perfectly free of contaminants, and resultant stiction must be overcome with sufficient torque from the spindle motor in order to achieve reliable, repeatable performance. The surface condition of the data storage media has also played an important function in stiction level. With coated oxide media, the level or amount of lubrication applied to the storage surface to protect against landing by the slider has directly affected stiction. In more recent thin film media applied by sputtering, the amount of molecular overcoat applied to harden and protect the thin film deposition also has affected stiction If the disk surface is made too flat, the slider will stick to the disk surface by virtue of the relative vacuum formed between the oppositely facing surfaces in contact. This is particularly a problem with data storage disks formed of glass substrate material Nominally, the coefficient of friction (mu) will be less than 0.5. For example, if a load force of 9.5 grams exists between the head slider and the disk surface, with a mu of 0.5, half the load force will be required to cause relative sliding motion between the slider and the data storage surface when they are in oppositely facing, sliding contact. When the slider sticks to the data storage surface (stiction), the mu will often increase to 1.0. This increased force must be overcome by starting torque generated by the spindle motor before the disk drive may function as intended.

In order to overcome the additional torque requirements imposed by stiction, dynamic head loading techniques have been proposed for loading the heads into flying orientation only after the disks have reached operating angular velocity and for unloading the heads prior to power-down. Dynamic head loading mechanisms have required additional space between the disks and have not proven to be very stable.

As briefly mentioned above, a third and still related limitation of prior art head mounting structures has been the limitation imposed upon servo bandwidths and head settling times on account of vibrational modes of the head arm, flexure, and head. At least one or more of these vibrational modes, referred to hereinafter as first bending mode, first torsional mode, lateral mode, second bending mode and second torsional mode, has contributed to relative head motion of a servo head leading to uncorrectable servo error phase shifts at a frequency which effectively marks the bandwidth limitation of any servo loop including a servo head moved by the ganged head actuator assembly. While addition of damping material has attenuated somewhat the undesireable servo loop phase shifts associated with the first and second torsional modes, addition of damping structures adds time and costs to the actuator structure. Thus, a need has arisen for an selectable array of combinations of head suspension arrangements which may be selected and used for increasing the vibrational frequencies, and avoiding aliasing, otherwise limiting servo bandwidth, so that data tracks may be placed more closely together and so that settling times following head seeking to destination track location are reduced.

Yet another limitation associated with some disk drives of the prior art has been the provision of dynamic head loading and unloading mechanisms which merely lift the data transducer heads off of the data surface while permitting them to dangle in close proximity above the data storage surface in the unloaded position. Since the heads are gimbal mounted by flexures and in that sense behave as pendulums, severe shocks attributable to rough handling have caused the unloaded heads to crash into the data storage disks and thereby damage or destroy them.

One other limitation associated with other disk drives of the prior art has been the provision of dynamic head loading and unloading mechanisms which engage head mounting load beams in a middle region, thereby causing the head end region to cantilever above the disk surface and requiring more vertical headroom for unloading due to amplification of head loading mechanism tolerances.

Thus, a hitherto unsolved need has arisen for an improved miniature fixed disk drive having a significantly higher data storage capacity by disks which are spaced closer together and which are rotated by an in-the-hub direct drive spindle motor, wherein the rotary head mounting structure manifests improved vibration characteristics leading to increased open loop servo bandwidths and reduced head settling times and wherein a dynamic head loading and unloading mechanism provides more positive control of head position during loading and unloading with less vertical headroom being required.

SUMMARY OF THE INVENTION WITH OBJECTS

A general object of the present invention is to provide improved head transducer load beam structural configurations for a head and disk assembly of a fixed disk drive which overcome limitations and drawbacks of the prior art.

A more specific object of the present invention is to provide an improved dynamic head loading and unloading arrangement for a fixed disk drive which improves upon prior approaches and which reduces disk spindle motor starting torque requirements, size, current and heat dissipation requirements.

Another specific object of the present invention is to provide a fixed disk drive which includes commonly ganged, vertically compacted load beam head mounting structures as part of an in-line rotary voice coil actuator structure which enable plural data storage disks to be spaced more closely together than heretofore, as close as one hundred thousandths of an inch, for example.

A further specific object of the present invention is to provide a in line load beam within a head mounting structure of a head and disk assembly which includes an integrally formed, longitudinally strengthened, in-line loading tab beyond a head slider which cooperates with a loading ramp in order to minimize the amount of vertical movement required for effective dynamic head loading and unloading.

One more specific object of the present invention is to provide truss-reinforcement of a reverse flange load beam in order to increase stiffness to increase the frequencies of resonance modes, thereby enabling development of wider bandwidth embedded sector servo loops for head position control without requiring load beam damping structures or techniques.

Yet another specific object of the present invention is to provide a dynamic head loading structure for a miniature fixed disk drive which enables more disks to be contained in a unit height and volume, which enables more concentric data storage tracks to be defined on storage surfaces of the disks, and which results in a lower power, more reliable disk drive having a greater useful life than heretofore.

Another specific object of the present invention is to provide a dynamic head loading structure for a disk drive which provides additional freedom for a gimbal mounted data transducer.

Still one more specific object of the present invention is to provide a repertory of techniques for adjusting modal resonant frequencies of a reverse flange load beam so as to avoid instabilities within head position servo loops including the load beam.

Yet another specific object of the invention is to provide a simple and reliable means for initially loading data transducer heads onto respective data storage surfaces during head and disk assembly in the manufacturing operation.

These and other objects are realized in a fixed disk drive head and disk assembly including a data storage disk rotating at a predetermined angular velocity relative to a base, and a rotary head actuator structure rotatably mounted to the base and including an in-line head arm for supporting and moving at least one data transducer head about a plurality of concentric data track locations defined on a data storage surface of the disk. In accordance with the present invention, the disk drive includes an improved data transducer head mounting structure which comprises an elongated load beam including a head arm attachment end region for attachment to an outward end of the head arm; a leaf spring loading region inwardly adjacent to the attachment end region; a flexure attachment region adjacent a head end region for attachment of a gimbal flexure for mounting the transducer head; and, a dynamic loading tab formed at the outermost part of the head end region beyond the transducer head.

In one aspect of the present invention, a peripherally flanged load beam region is located between the leaf spring loading region and the dynamic loading tab. The load beam region includes two generally L shaped peripheral longitudinal flanges facing toward the data storage surface associated with the data transducer head attached to the gimbal flexure and may further include reinforcement trussing secured to the lower edges of the longitudinal flanges to form a box section.

In another aspect of the present invention, a loading ramp structure is positioned adjacent to a peripheral edge of the storage disk and cooperates with the dynamic loading tab, so that as the rotary head actuator structure moves the load beam toward the periphery of the disk, the dynamic loading tab engages the loading ramp structure and progressively lifts the load beam away from the data surface as the rotary actuator moves the load beam to a fully unloaded rest position beyond the periphery of the data storage disk. In a related aspect of the present invention, the loading ramp structure lowers the load beam toward a major plane of a storage surface of the disk, thereby to stabilize the load beam at the rest position and prevent inadvertent or accidental reloading of the head onto the storage surface. In this aspect a first slope region overlying an outer portion of the data storage surface of the disk slopes upwardly away from the storage surface and a second slope region adjacent the common mounting post beyond the disk periphery which slopes toward the plane of the data storage surface, the second slope region being provided for parking the data transducer heads away from the data storage surface and beyond the outer periphery of the disk.

In yet a still further aspect of the present invention, the loading ramp structure includes a load ramp associated with each load beam and each load ramp is positioned and mounted to the base by a common mounting post.

In one more aspect of the present invention, the leaf spring loading region is tailored and configured to provide a desired static loading force to bias the head toward the storage surface and simultaneously to control modal resonances otherwise adversely affecting servo loop stability of the head positioner. In a related aspect, the leaf spring loading region may define a central longitudinal opening.

In still one more aspect of the present invention, a dampener structure may selectively be added to the load beam to attenuate the magnitude of modal resonances otherwise adversely affecting head positioner servo loop stability.

In another aspect of the present invention, the disk drive comprises a plurality of commonly mounted, closely spaced apart, parallel data storage disks and the rotary actuator structure provides head arms interleaved between the disks, there being a head mounting structure for each data storage surface of each disk. At least one head arm connects to and supports two head mounting structures in vertical alignment relative to the data storage disks and the rotary actuator structure.

In a further aspect of the present invention, the plural disks may be spaced apart as closely as one hundred thousandths of an inch.

In one more aspect of the present invention, the elongated load beam has an uncorrectable servo loop phase shift attributable to lateral mode vibration at a frequency not substantially lower than 6000 Hz and has a correctable second torsional mode vibration at a frequency not substantially lower than 5000 Hz.

In still one more aspect of the present invention the load beam box structure includes trussing extending between the two peripheral longitudinal flanges to provide additional strength to resist torsion mode vibration without significant addition of mass to the load beam structure.

In yet another aspect of the present invention, longitudinal flanges of the load beam region comprise generally L-shaped or box channels, and the trussing comprises an X-shaped cross piece which is attached to apex edges of the channels to form the box structure.

These and other objects, advantages, aspects and features of the present invention will be more fully appreciated and understood upon consideration of the following detailed description of a preferred embodiment, presented in conjunction with the accompanying drawing.

BRIEF DESCRIPTION OF THE DRAWINGS

In the Drawings:

FIG. 3 is an enlarged detail plan view of a head mounting structure and loading ramp of one head and disk surface of the disk drive depicted in FIG. 1.

FIG. 3a is a head end view in elevation of the head mounting structure depicted in FIG. 3.

FIG. 3b is an enlarged, diagrammatic view of a slightly modified form for the head mounting and load tab region of the FIG. 3 mounting structure.

FIG. 3c is a sectional view of the FIG. 3b detail, taken along line 3c—3c in FIG. 3b.

FIG. 3d is a head end view of the FIG. 3b mounting structure.

FIG. 5 is a side view in elevation of the head suspension and ramp shown in FIG. 3.

FIG. 6 is an end view in elevation of the head suspension and ramp shown in FIG. 3 with the head shown in the fully unloaded position on the left, and with the head shown in the fully loaded position adjacent to the ramp on the right side of the figure.

FIG. 7a is an enlarged plan view of a gimbal flexure of the type shown in FIGS. 3 and 4.

FIG. 7b is a side view in elevation of the FIG. 7a flexure.

FIG. 7c is a sectional view in elevation taken along a longitudinal axis section line 7c—7c of the FIG. 7a flexure.

FIG. 7d is an end view of the FIG. 7a flexure

FIG. 11a showing a full wrapped flange design, FIG. 11b showing vertical and horizontal portions within the longitudinal flanges, and FIG. 11c showing vertical flanges only. FIG. 11b is a graph comparing vibration mode resonant frequencies of the FIG. 11a, 11b and 11c designs without offset.

FIG. 12a, 12b and 12c respectively illustrate three reverse flange mounting structures in side view: FIG. 12a illustrating an upward or positive positional offset, FIG. 12b illustrating no positional offset, and FIG. 12c illustrating a negative positional offset.

DETAILED DESCRIPTION OF A PREFERRED EMBODIMENT

Figure 1:
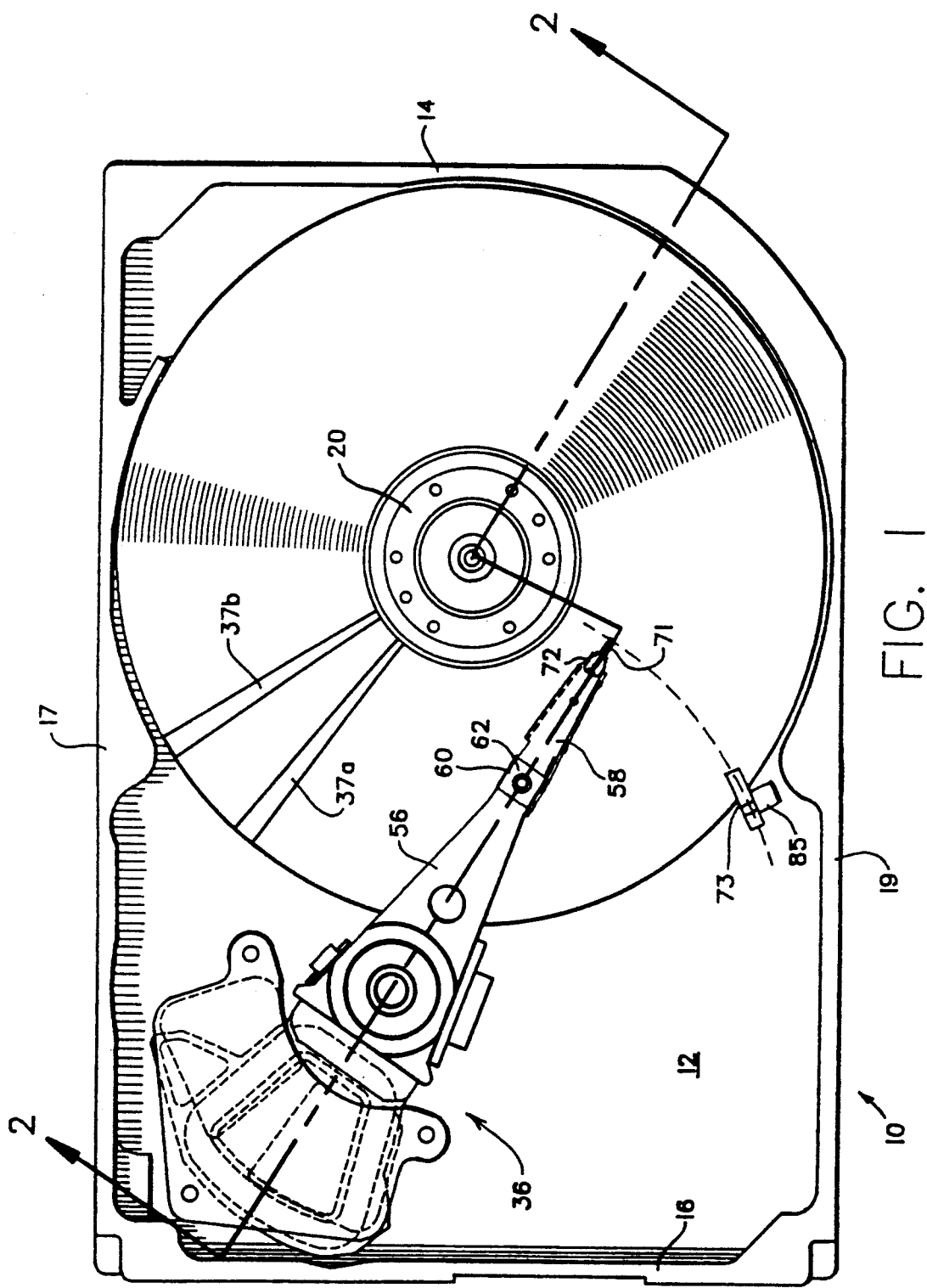
FIG. 1 is a diagrammatic top plan view of a miniature micro-Winchester fixed disk drive having a plurality of commonly journalled disks and a ganged, in-line rotary voice coil actuator structure which includes head mounting structure in accordance with the principles of the present invention.
Figure 2:
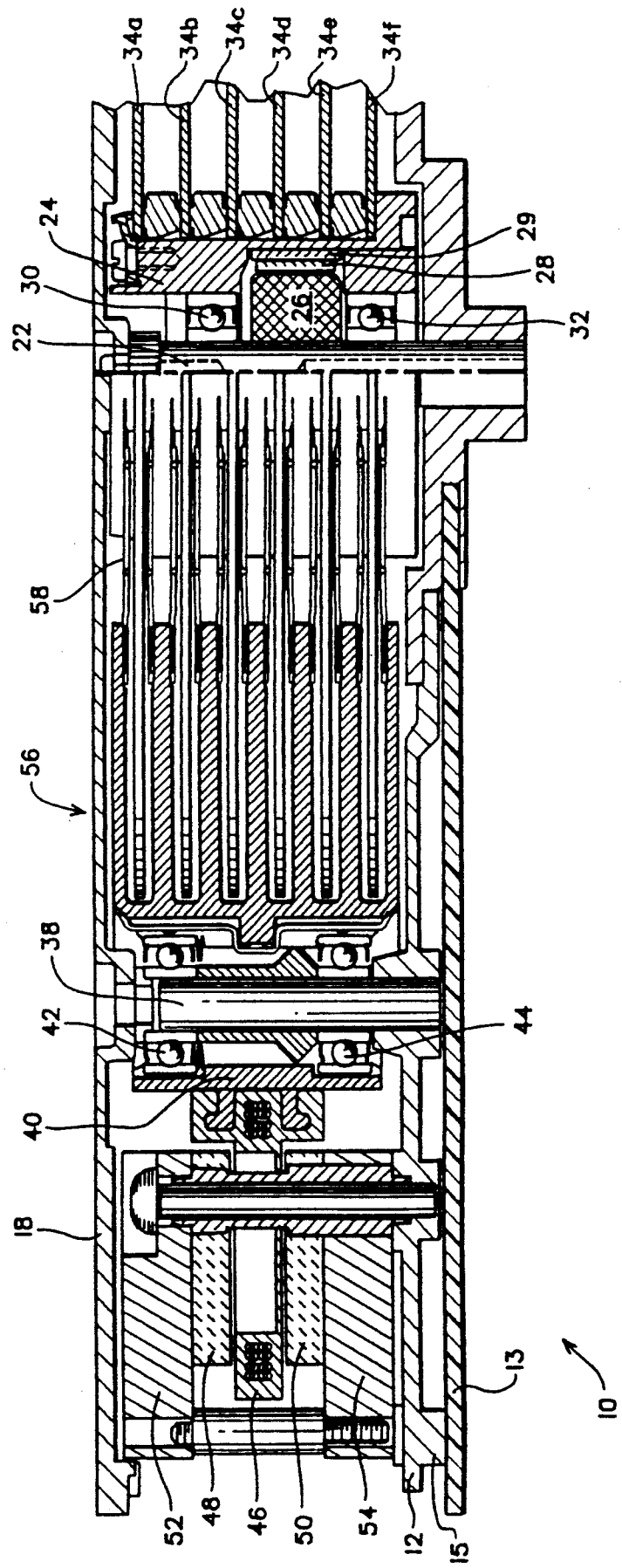
FIG. 2 is a diagrammatic view in section and side view elevation of a portion of the disk drive depicted in FIG. 1, taken along the section line 2—2 in FIG. 1.

With reference to FIGS. 1 and 2, a disk drive data storage subsystem 10 occupying a volume nominally accorded to a standardized micro-Winchester form factor includes a base 12, typically formed of cast aluminum and defining end walls 14 and 16 and side walls 17 and 19. A cover 18 encloses the space defined by the base 12 and walls 14, 16, 17 and 19 so that the interior of the disk drive is effectively hermetically sealed from the ambient (except for a conventional breather filter which is not shown in these figures) A printed circuit board 13 carries the electronics components of the disk drive subsystem 10 and it is. secured by threaded screws to bosses 15 extending downwardly from the base 12.

A disk drive spindle assembly 20 includes a shaft 22 which is press fit into an opening formed in the base 12. A disk spindle hub 24 defines an interior space for a fixed poly-phase stator winding 26 and a rotating permanent magnet ring 28 secured to an annular ferromagnetic flux return ring 29 mounted on the inside wall of the hub 24. The winding 26, magnet ring 28 and flux return ring 29 define an in-hub direct drive DC brushless spindle motor. Commutation sensors, such as one or more Hall effect sensors (not shown) may be provided for generation of appropriate driving current phases which are applied to the in-hub spindle motor in conventional fashion Seals (such as ferrofluid seals, not shown) separate the spindle motor within the hub and spindle bearings 30 and 32 from the sealed interior space of the disk drive 10.

As many as eight data storage disks 34 may be journalled to the base 12 via the hub 24. In accordance with the principles of the present invention, the disks 34 are so dimensioned and spaced as to have oppositely facing data storage surfaces spaced apart as closely as one hundred thousandths of an inch (0.100"). Six disks 34a, 34b, 34c, 34d, 34e, 34f, having nominal 95 millimeter diameters are shown in FIG. 2, by way of illustration. These disks 34 are rotated at a predetermined angular velocity by the in-hub spindle motor 29.

Each disk 34 defines two data storage major surfaces, each of which is capable of storing up to 50 megabytes of user data, or more, in a multiplicity of concentric data storage tracks One disk surface may be prerecorded with track centerline servo correction information, e.g. in a tri-bit pattern, for example. A particular track is selected by moving a ganged actuator assembly 36 to a "cylinder" location, and then selecting a particular data transducer head 72 in order to obtain access to the particular storage surface containing the desired track. (The term "head" is sometimes used herein to include both the electromagnetic head winding and the slider structure which incorporates the head winding). Additionally, or alternatively, servo information may be embedded within the data sectors of each disk surface FIG. 1 shows two servo sectors 37a and 37b which are presented as representative of servo sectors embedded throughout the area of the disk surface and which contain prerecorded track and sector identification numbers, and which also contain a burst pattern enabling calculation of track centerline offset values by a digital controller of the disk drive acting within a head position servo control loop. Embedded servo sectors 37 may be included in addition to a servo surface, or in lieu of a servo surface. Embedded servo sectors 37 have the advantage of enabling each data transducer head 72 to act as a servo head during the time that the sector is passing under the head 72. In this way, each data head 72 will more accurately follow its associated tracks despite shifts in position due to thermal cycling of the drive or mechanical jarring, etc., which might otherwise set up positional differentials between a servo track of a servo surface, and a nominally aligned data track within the cylinder defined by the servo track.

The rotary voice coil actuator assembly 36 includes a central shaft 38 pressed into an opening in the base 12. An actuator hub 40 is rotatably mounted to the shaft 38 by an upper bearing 42 and a lower bearing 44. A flat, trapezoidal coil 46, encapsulated within a suitable plastic and molded as an integral part of the actuator hub 40, is disposed between two permanent magnets 48 and 50. Flux return plates 52 and 54 complete a magnetic circuit having a flux gap through which the coil 46 passes. Current passing through the coil 46 in one direction causes the actuator hub 40 to rotate in one direction. Reversing the current causes reverse direction movement of the actuator hub 40. The rotating part of the actuator structure 36 is mass balanced about its axis of rotation, so that gravitational forces will not influence position thereof with various orientations of the disk drive 10.

As seen in FIG. 2, the actuator hub 40 includes a series of vertically aligned head arms 56 arranged in interleaved relationship relative to the disks 34. One or two load beams 58 are secured to each head arm 56 at an attachment region 60 at one end of the load beam 58, depending upon whether the arm is above/below a disk surface or in between two oppositely facing disk surfaces The region 60 is made more rigid by a thickened reinforcement load plate 61 which is laser welded to the load beam 58 at multiple locations surrounding a central opening 59. One manner of attachment of the load beam 58 to the arm 56 is to provide a grommet 62 which passes through and is swaged over the opening 59 defined in the arm 56 and load plate 61. Other possible attachment methods include use of screws, epoxy adhesives, or other forms of bonding or spot welding. The load plate 61 is typically a 300 series stainless steel part and serves to connect the load beam 58 to the arm 56.

With reference to FIGS. 3, 4, 5 and 6, each load beam 58 of the actuator assembly 36 includes two reversed ribs 63 and 64 formed along longitudinal edges of the beam 58. The ribs 63 and 64 are reversed in the sense that they are L-shaped flanges which are folded downwardly and then outwardly to define a lower shelf 65 extending generally parallel with the disk surface of the disk 34 with which the head 72 supported by the particular load beam 58 is associated. The load beam 58 is formed by stamping 300 series stainless steel sheet approximately 2.5 mils thick.

A preload-providing leaf spring portion 66 of the load beam 58 enables the head slider 72 to be preloaded with a predetermined force (e.g. 7 to 9 grams) toward the surface of the disk 34. (Formation of the load beam 58 with a deformation of the leaf spring 66 is discussed hereinafter in conjunction with the discussion of offset as illustrated in FIGS. 12a through 12e.) Each load beam 58 must have low stiffness in a direction perpendicular to the disk 34 but must be very stiff and possess high natural frequencies of vibration in directions parallel to the data storage surface of the disk 34. As loading force is reduced, the longitudinal length of the leaf spring region 66 may be shortened, and since torsional mode stress is concentrated in the outer segments of the section 66, a central opening 67 may be defined without impairment of the preload function and with further reduction in the mass of the load beam structure 58. This approach results in a further increase in frequency of the first torsional resonance mode discussed in greater detail hereinafter.

Figure 4:
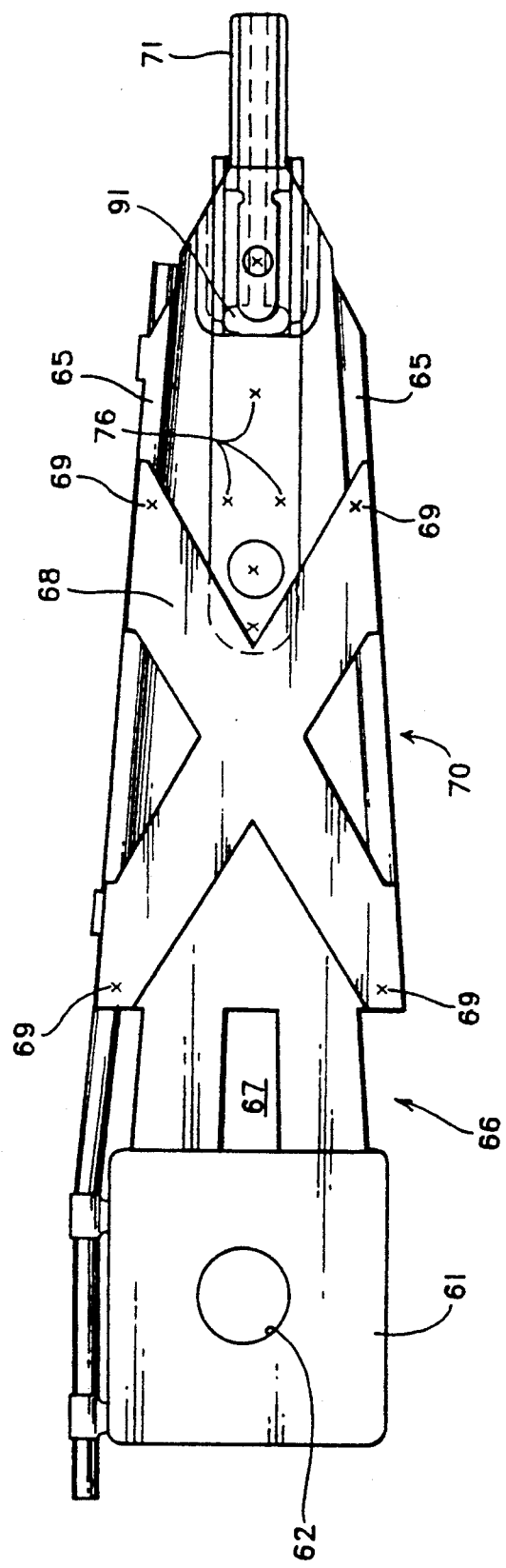
FIG. 4 is a bottom plan view of the head mounting structure depicted in FIG. 3.

A trussing member 68 is preferably but not necessarily formed as a cross-brace shown in FIG. 4. The member 68 may be formed of 300 series stainless steel 2.5 mil sheet. It is spot welded to the lower shelfs 65 at a minimum of four locations 69 during fabrication of the mounting structure 58. The trussing member 68 adds very little to the overall height or to the mass of the load beam 58 and advantageously significantly increases the resistance of the load beam 58 to torsional vibrations by providing a completed "box structure" in a stiffened region 70. While an X-shaped trussing member 68 is presently most preferred, any structural member providing a trussing or diagonal reinforcement function in tension across the lower edges of the reversed ribs will contribute significantly to the stiffening of the load beam. In practical terms, addition of the trussing member 68 results in approximately a 400 Hz increase in the resonance frequency of the first torsional vibration mode, increasing this resonance from approximately 1500 Hz to approximately 1900 Hz. As mentioned, shortening the leaf spring region 66 and providing a central opening therein also-increases the first torsional resonance mode and provides a unique way for "tuning" the load beam 58 to the desired resonance characteristics as may be required by a particular head positioner servo design.

With further reference to FIGS. 3, 4, 5, 6, 8, 9 and 11a, 11b, 11c a head loading tab 71 is shown to be integrally formed at the end of the load beam 58 distant from its attachment region 60. The tab 71 extends just beyond the front end of the head slider 72, and the tab 71 enables dynamic loading and unloading of the head slider 72 from its associated disk surface in con with a loading ramp structure 73 associated therewith. A longitudinal channel 84 as shown in FIGS. 3, and 3a, and a slightly lowered longitudinal channel 93 as shown in FIGS. 3c, 3d, 5, 6, 8, 9, 11a, 11b, 11c, 12a, 12b, and 12c, provides longitudinal strengthening to the loading tab 71 and also provides a camming surface aligned with the longitudinal axis of the load beam 58. The camming surface thus defined follows the guiding surface of the loading ramp structure 73.

A damping plate 74 which may be formed of a stainless steel sheet nominally two mils thick and coated with a layer of adhesive damping material such as 3M's ISD 110, also nominally two mils thick, may be affixed to the top surface of the load beam 58 as shown in FIG. 3. When used, the damping plate 74 serves to damp out any flexing due to the first torsional mode of vibration which can result from variations in flatness of the disks 34. The adhesive coating of the damping plate 74 is pressed onto the top of the load beam 58 and then heat is applied to cure the adhesive and bond it to the load beam. Backed pressure sensitive adhesives are also sometimes used as damping media for load beams but manifest a lower heat temperature range than heat-cured adhesives.

While the damping plate 74 is effective to reduce the amplitude of the first torsional mode, it is not effective in increasing the frequency of this mode. Also, the damping plate 74 is expensive to make and apply in manufacturing and adds to the moment of inertia of the head arm but is a useful and sometimes needed technique in order to reduce vibrational instabilities within the load beam mounting structure 58 which are excited by and/or interfere with the head positioner servo system of the drive 10. The damping plate 74 may be used in combination with the trussing member 68; or, more preferably, the trussing member 68 may be provided in lieu of the damping plate 74, thereby considerably reducing the cost of the load beam structure 58 without significant addition of mass and moment of inertia to the head arm assembly of the disk drive subsystem 10.

As perhaps best seen in FIGS. 7a, 7b, 7c and 7d, a gimbal mounting flexure 75 is provided as a gimbal mounting for the head 72, so that the head may freely the contour of the surface of the disk 34 above which it is flying on an air bearing cushion. The mounting flexure 75 is attached by spot welds 76 to the load beam 58. The flexure 75 provides a low stiffness gimbal action by connecting the load beam and a central contact point of the slider 72. A hemispherical "dimple" 76 is formed in a central leg 77 of the flexure 75 which is attached to the slider by an adhesive The dimple 76 forms the central contact point between the head slider 72 and a facing adjacent location of the load beam 58. Two outer leg regions 78 separate the central leg 77 from the body of the flexure 75 which is welded to the load beam 58, and they act as independent leaf springs, enabling the slider 72 to pivot independently defined by the dimple 76. Angled connecting web regions point defined by the dimple 76. Angled connecting web regions 79 connect the central leg 77 and the outer legs 78 together to complete the gimbal structure 75. The head slider 72 is affixed to the central leg 77 of the flexure by a suitable adhesive, and an inspection hole 91 (FIGS. 3 and 4) enables the worker to observe that the adhesive has flowed throughout a contact area between the central leg 77 and the top of the slider 72.

The head slider 72 is preferably a "micro" size slider which is approximately 70% the size and mass of the Whitney sized slider heretofore widely used in miniature fixed disk drives of the micro-Winchester variety. The electromagnetic transducer data read/write head itself is preferably a thin film coil formed at an outermost rail at one end of the slider 72. Thin wires 80 carried in a small diameter plastic insulator tube 81 connect the head to appropriate head write driver/read preamplifier circuitry (not shown) which is preferably included on a flex circuit located within the enclosed space defined by the base casting 12 and cover. Conveniently, the plastic tube 81 may be nested against the adjacent L shaped flange 64, as shown in FIG. 3, and held in place by tab extensions 82.

Two raised outer portions 83, as best seen in FIG. 3a, are provided symmetrically about the location of attachment to the gimbal flexure 75 for the transducer head 72. The raised portions 83, which are typically symmetrical, provide a greater degree of freedom of movement for the outer legs 78 of the gimbal flexure 70 and data transducer head 72 relative to the load beam 58. In addition, the raised portions 83 provide additional longitudinal rigidity to the loading tab 71 and the gimbal flexure 70. Preferably, the location of attachment between the load beam 58 and the gimbal flexure 70 is as close as possible to the plane defined by the neutral axis of the flexure outer legs 78, in order to avoid excessive wear of the dimple pivot location 76 while preserving freedom of movement for the flexure 75. To this end, the dimple point 76 of the gimbal flexure 75 can be seen in FIG. 3a to be in contact with the downwardly projecting underside of a depressed central channel portion 84 of the load beam 58 spanned by the raised outer portions 83. The provision of a depressed channel portion 84 advantageously provides a cam follower surface for the loading tab 71 in order to follow the guiding surfaces of the ramp 73.

FIGS. 3b, 3c and 3e illustrate a slightly modified load beam 58'in which the load tab 71a has a longitudinal channel 93 which is formed to be below the level of the main central channel 84 (shown in FIG. 3a). This arrangement lowers slightly the cam follower surface for following the guiding surface of the load ramp 73 and further decreases slightly the spacing achievable between adjacent storage disks 34.

Figure 8:
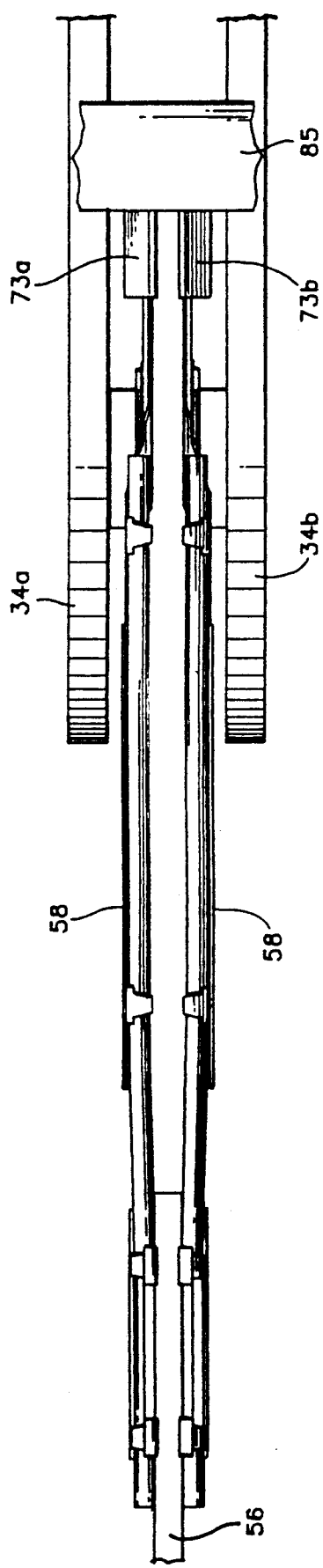
FIG. 8 is an enlarged detail side view of two oppositely facing head mounting structures of the type depicted in FIG. 3 arranged between two adjacent disks of the FIG. 1 drive.
Figure 9:
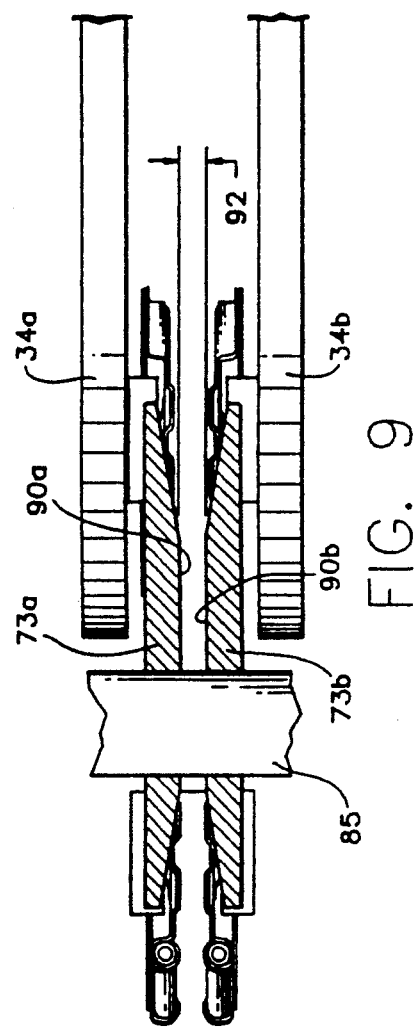
FIG. 9 is a detail end view of the FIG. 8 configuration with the loading ramps in section to provide clarity.

With reference to FIGS. 6, 8 and 9, a separate loading ramp 73 is provided for each load beam 58. The loading ramps 73 are maintained in vertical alignment by a common post 85 secured to the base casting 12. Each ramp 73 includes a radially outward park region 86 and a radially inward load and unload region 88, relative to the center of rotation of the disk spindle 20. The guiding surface of the load and unload region 88 of the ramp 73 slopes from a flat plateau 90 toward the storage surface of the disk 34, and the guiding surface 76 of the park region also slopes from the plateau 90 downwardly and away from the peripheral edge of the disk 34.

It is important to isolate each slider 72 away from the surface of the disk 34 when unloaded, so that shocks and vibrations of the disk drive 10 will not cause the gimbal mounted sliders 72 to respond as pendulums and strike the disk surface. The slope of the guiding surface 86 of the park region therefore is selected so that severe shocks and vibrations will not cause the actuator structure 36 to rotate toward the disk 34 and inadvertently cause the head sliders 72 to come into contact with the disk surface when nominally in the unloaded position The loading and fully unloaded positions of the load beam 58 relative to the disk 34 are diagrammed in FIGS. 6 and 9. A crash stop of the actuator assembly 36 limits the arcuate locus of rotation of the actuator arms 56 and ganged load beams 58, thereby keeping the load tab 71 on the slopes 86 in the fully unloaded positions.

The electromechanical rotor of the actuator assembly 36 develops sufficient torque to cause the load tabs 71 of all of the load beams 58 to slide over their associated loading ramps 73 in a controlled manner during dynamic head loading and unloading operations. By unloading the head sliders 72 from the disks 34 and moving them to the park position away from the disk surface, the torque required of the in-hub spindle motor to start and rotate the disks 34 is significantly reduced over what it would be if the sliders rested upon the disk surfaces during power off conditions and starting friction ("stiction") resistances had to be overcome.

As noted in the referenced U.S. Pat. No. 4,669,004, at column 9, lines 3 through 8 thereof, an electrodynamic return spring may be provided to return the head assembly to the head parking position whenever primary power is removed from the in-hub spindle motor. The spring may be implemented by automatic circuitry for switching counter EMF generated by rotation of the spindle motor from energy stored in the disk stack into the rotary actuator 36.

By providing the loading tab 71 at the end of the load beam 58, sufficient space is realized to enable the loading ramp 73 to fit under the tab 71 without interference with the L-shaped reverse flanges 63 and 64 as would occur with reverse rib load beam designs of the prior art. Also, by providing the loading and unloading tabs 71 adjacent to the head sliders 72, more positive control of the dynamic head loading operation occurs, and vertical displacement due to tolerance effects is minimized. Also, the loading tabs 71 extending at the end of the load beams 58 serve to protect the sliders 72 and their respective flexures 75 from handling damage during disk drive assembly.

The mounting post 85 is preferably integrally formed of the same material as the loading ramps 73 and the resultant assembly enables the ramps 73 to be attached as an integral unit to the base 12. A mounting connection to the top plate 18 may also be provided in order to stabilize the position of the loading ramp structure.

FIGS. 8 and 9 show a height compacted, two-disk arrangement for a head and disk assembly with a single head arm 56 interleaved between two oppositely facing surfaces of two adjacent disks 34a and 34b, for example. These two figures illustrate in greater detail that the reverse flange load beams 58 may be positioned much closer together than heretofore, and still effectively work within a disk drive 10 providing dynamic head loading and unloading by virtue of the loading tabs 71 and ramps 73. FIG. 9 illustrates that the oppositely facing plateau regions 90a and 90b of the ramps 73a and 73b must be spaced apart by a minimum distance denoted by the reference numeral 92 so that the tabs 71 will still be slightly spaced apart as the actuator 36 moves the head arm and load beam structure across the plateau regions 90.

With conventional load beams of the prior art including the IBM 3370 Whitney structure, as described for example in U.S. Pat. No. 4,167,765, the disclosure of which is incorporated herein by reference, and with the so-called micro-Whitney structure which is approximately 70% the size of the original Whitney load beam structure, there are at least five vibrational modes which must be considered in analyzing dynamic load beam performance within a disk drive.

There are five detectable bending modes associated with a load beam: first torsion, first bending, second torsion, lateral and second bending. The resonant frequencies of these modes for the standard 3370 Whitney suspension, the 70% micro-Whitney suspension, a reverse flange load beam suspension without cross brace, and a reverse flange load beam 58 having a cross brace are charted in FIG. 10A.

The two bending modes are characterized by up and down displacements of the load beam relative to the data storage surface: a first bending mode which constitutes a resonance at a fundamental frequency or period of vibration of the load beam, and a second bending mode which occurs at a higher frequency. With in-line actuators of the type shown herein and shown in the referenced U.S. Pat. Nos. 4,669,004 and 4,783,705, and U.S. Pat. application Ser. No. 07/192,353 filed on May 10, 1988, the up and down oscillation of the bending modes contribute very little to lateral (side to side) displacement of a servo track transducer, and consequently no damping or correction processes are required to correct for either bending mode.

Figure 10A:
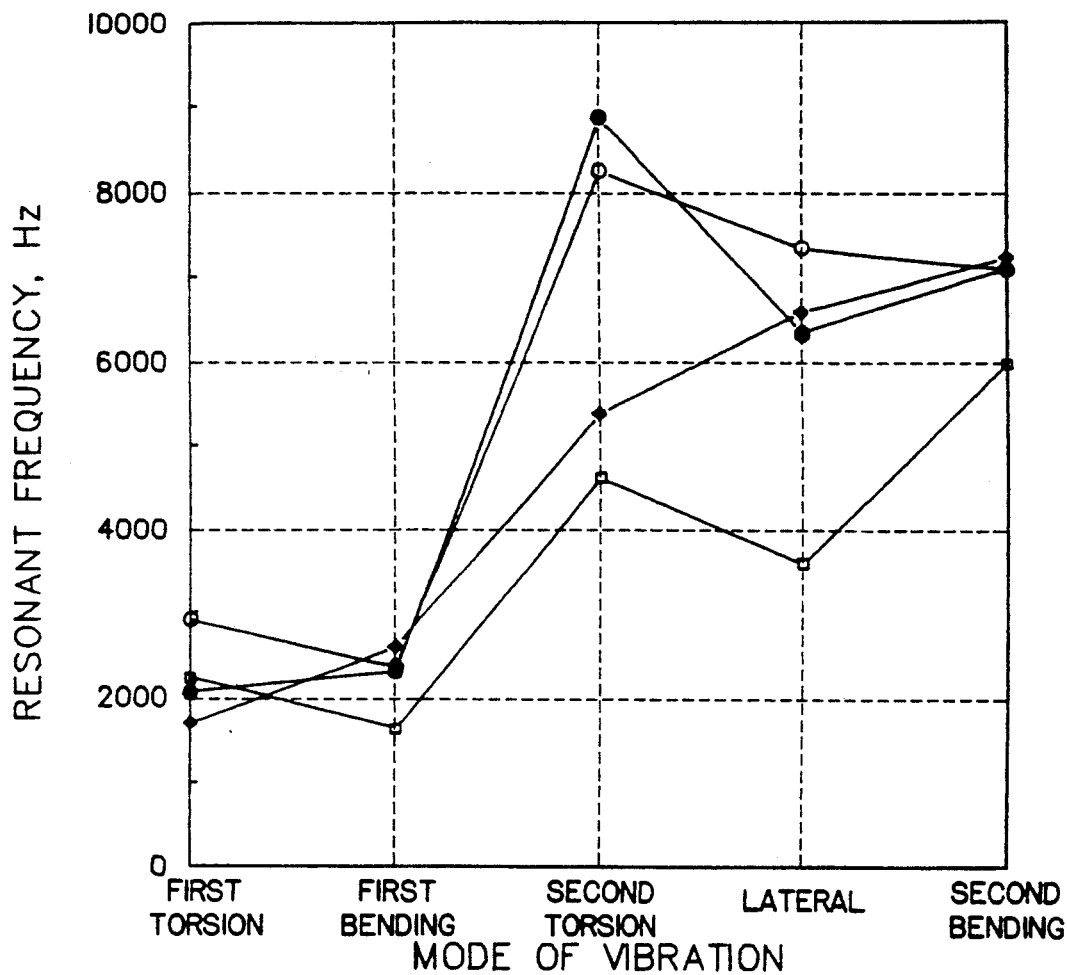
FIG. 10a is a graph comparing vibrational modes of a standard 3370 Whitney suspension, a 70% scale micro-Whitney suspension, a reversed flange suspension without cross-bracing, and a reversed flange suspension having cross-bracing, as used within an in-line actuator structure of a disk drive such as the type shown in FIG. 1.
Figure 10B:
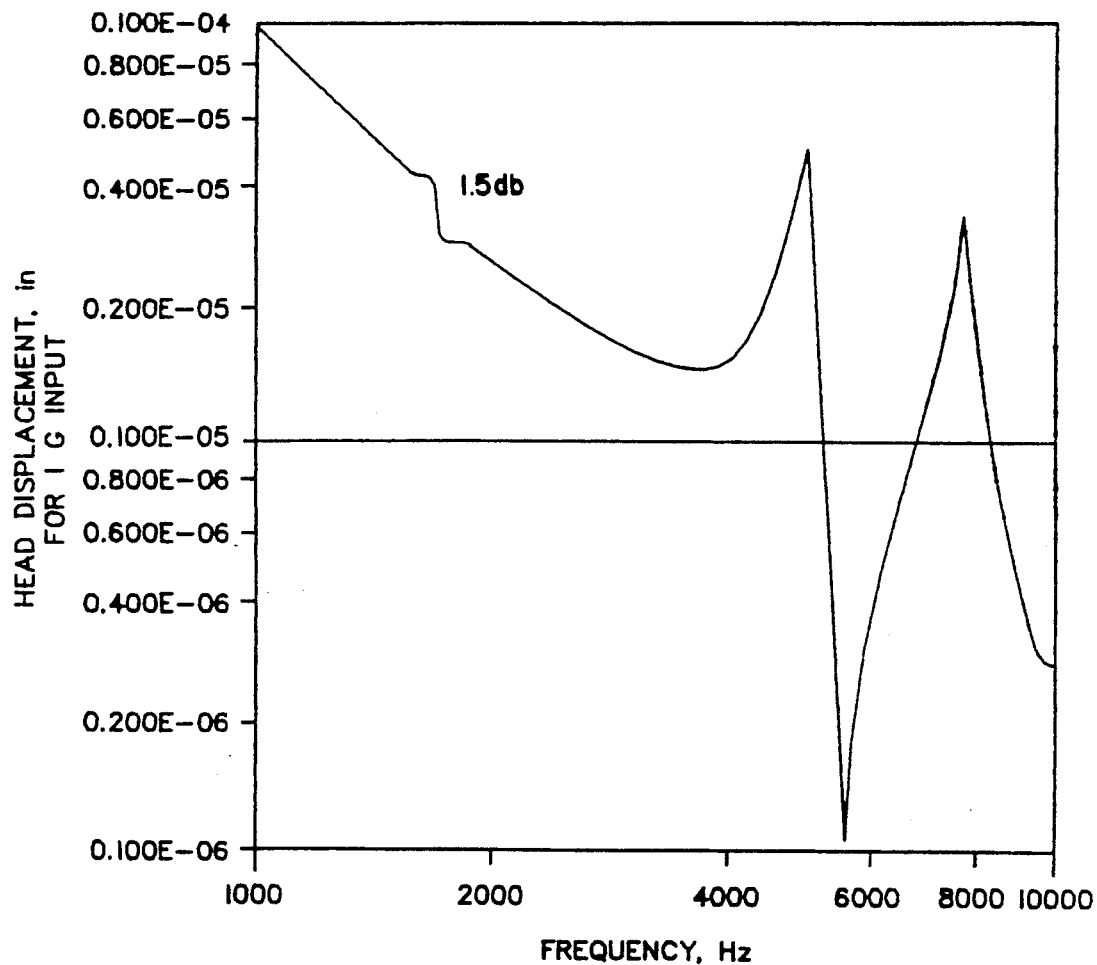
FIG. 10b is a graph of frequency response of a reversed flange suspension without cross-bracing.
Figure 10C:
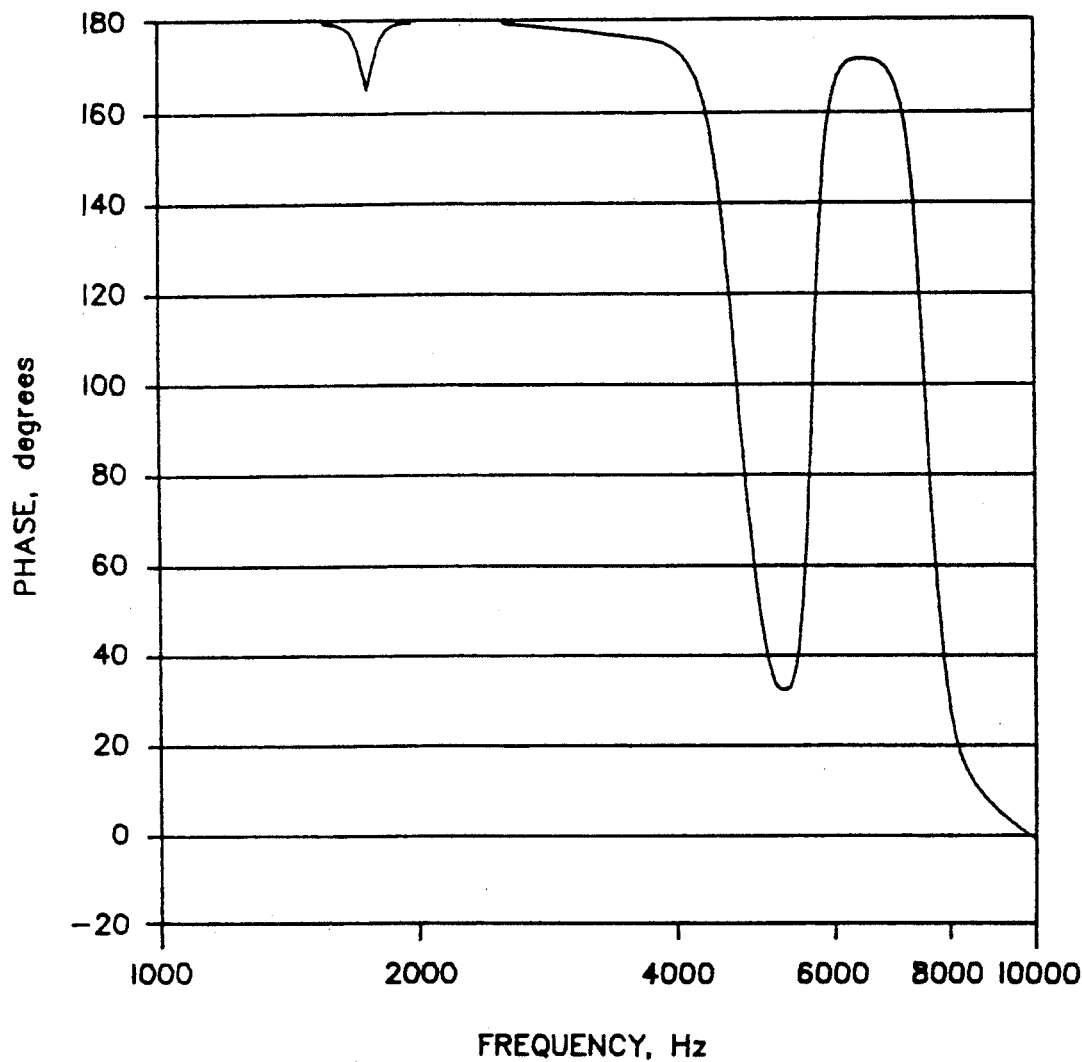
FIG. 10c is a graph of phase angle of a reversed flange suspension without cross-bracing.

There are two torsional mode vibrations which represent rotation or twisting along the load beam: a first torsional mode at a fundamental vibration frequency and a second torsional mode at a higher frequency Torsional mode resonances are shown as the left two discontinuities on the amplitude and phase angle plots of FIGS. 10b and 10c respectively for the reverse flange in line load beam without cross bracing. Torsional resonances occur at frequencies which are different from the bending mode frequencies. With the Whitney structure, the first torsional mode creates a significant servo loop phase shift, but this shift may be corrected for by laminating a damping medium, such as the damping plate 74 shown in FIG. 3, onto the load beam 58.

The most severe vibrational mode of the Whitney load beam is called the lateral mode and it comprises side to side vibrational displacements. At lateral mode resonance, the head moves from side to side with such displacement that the servo loop phase shifts by 180 degrees and is therefore uncorrectable. The lateral mode resonance within an in-line actuator structure constitutes a physical limitation upon servo loop bandwidth and are graphed for the reverse flange 70% size load beam as the right most dip on the graphs of FIGS. 10b and 10c.

As graphed in FIG. 10a, testing of a micro-Whitney load beam with upturned flanges facing away from the data storage surface has shown that the first bending mode occurs at slightly below 2000 Hz. The first torsional mode occurs at slightly above 2000 Hz and results in a correctable phase shift of about 25 to 30 degrees. The lateral mode occurs at about 3800 Hz.

With a flat reversed flange load beam without cross brace, the first torsion mode of vibration occurs at about 1800 Hz and contributes little (20 degrees) of phase shift and low amplitude purturbation (1.5 dB) to the open loop servo bandwidth of the head positioning servo system of the drive 10. The second torsion mode occurs at approximately 5400 Hz and causes approximately a 40 degree servo loop phase shift. Since this frequency is relatively high, very little, if any dampening techniques are required in order to stabilize the servo loop. The second bending mode occurs at approximately 5600 Hz and contributes nothing negatively to servo phase The lateral mode, which causes a major phase shift of 180 degrees and thereby constitutes the physical limit of servo open loop bandwidth, occurs at approximately 5000 Hz. The higher frequency enables open loop bandwidths to be increased, thus providing an improvement over contemporary head positioning servo loops which are bandwidth limited by load beam lateral mode tolerances. As can be seen by the FIG. 10a comparative graph, and the amplitude and phase plots of FIGS. 10b and 10c, the reverse flange load beam 58 of the present invention presents no uncorrectable resonances below the uncorrectable lateral mode resonance frequency, thereby eliminating any need for damping devices or laminations.

Figure 11D:
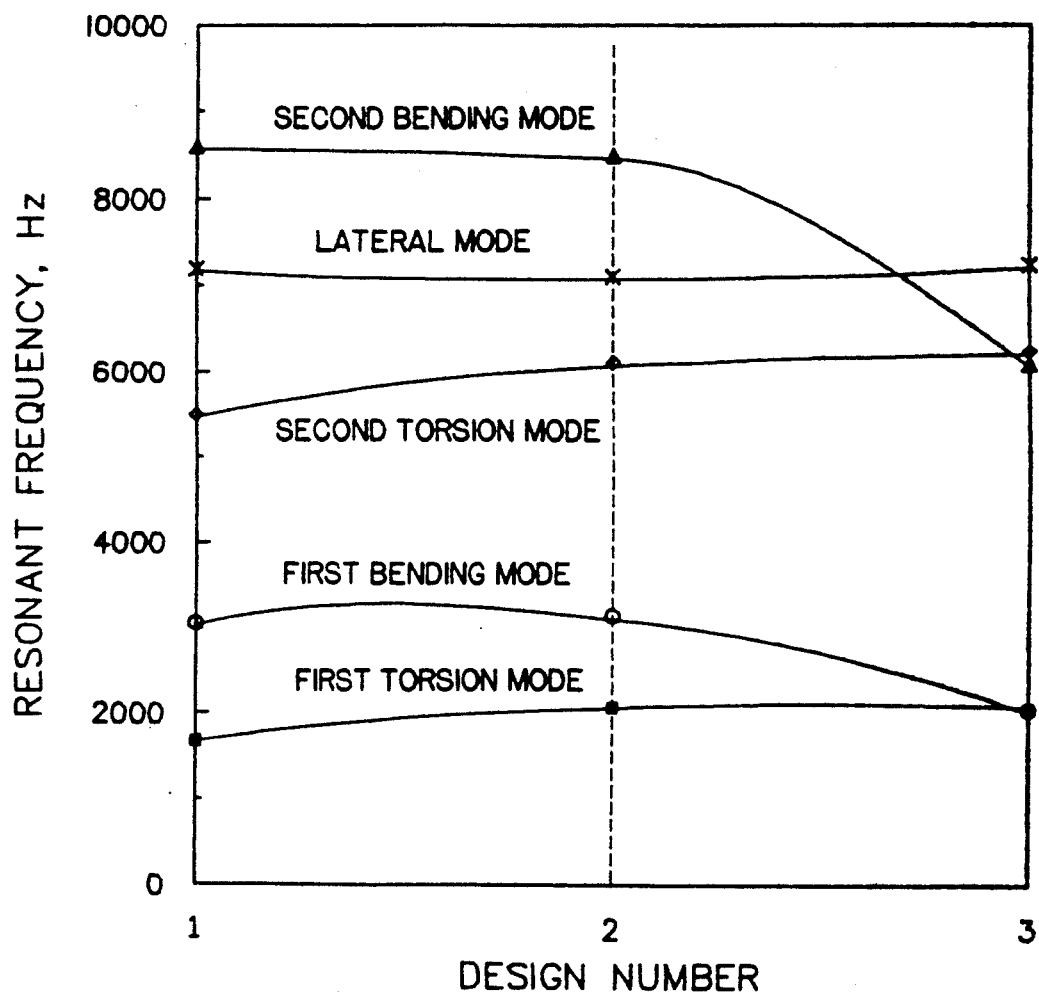
FIGS. 11a, 11b and 11c are highly diagrammatic transverse sections in elevation of three reversed flange suspensions.

FIGS. 11a, 11b and 11c respectively illustrate three different cross sections of head mounting structures: FIG. 11a showing a full channel structure; FIG. 11b showing an L-shaped flange structure having the bottom shelf at each peripheral flange; and, FIG. 11c showing load beam having downwardly dependent vertical flanges without further reinforcement. FIG. 11d plots modal resonances for each of the load beam designs illustrated in FIGS. 11a, 11b and 11c for the five resonance modes discussed above, as determined analytically. While the flange angle for the cross sections as shown in FIGS. 11a, 11b and 11c are nominally on the order of 100 degrees, the actual angle may vary considerably in practice with little change in results. FIG. 11d confirms that the reverse flange load beam 58 (FIG. 11b) manifests resonance characteristics which are very similar to the full channel design (FIG. 11a); however, the load beam 58 is lighter since it includes less material and therefor may be moved with less torque from the actuator 36.

FIGS. 12a, 12b and 12c illustrate generally in side view three load beams 58a, 58b and 58c which are to be understood as being in a fully loaded, "flying" orientation with respect to a rotating disk surface (not shown). Each load beam 58 is made by the same manufacturing process, but each one manifests a different offset characteristic due to tolerances arising from the manufacturing process and from slight differences in material characteristics, etc.

Figure 12E:
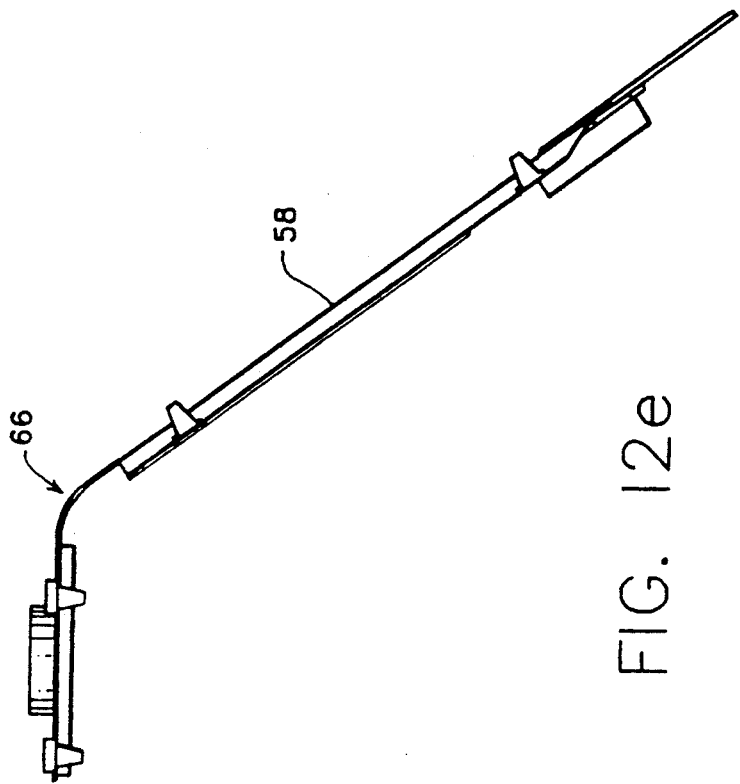
FIG. 12e shows the FIG. 12d reverse flange mounting structure after deformation and following a stress relief process.

The load beam 58a of FIG. 12a includes a leaf spring region 66a which tilts upwardly slightly and therefore has a positive offset. The load beam 58b of FIG. 12b is essentially flat and has zero offset. The load beam 58c of FIG. 12c tilts downwardly slightly and therefore has a negative offset characteristic. As previously mentioned, the leaf spring region 66 of the nominal load beam 58 provides a bias force to bias the head against the disk surface so that it flies in close proximity thereto upon an air bearing. Loading forces of 7 to 12 grams are nominal for the load beams 58. In order to provide the bias force, the leaf spring 66 of the load beam 58 is bent around a mandrel 92 in the manufacturing process, as diagrammed in FIG. 12d. This approximately 90 degree deformation of the leaf spring actually causes a residual bend, FIG. 12e to remain in the unloaded load beam 58. After the FIG. 12d bending operation, the unloaded load beam 58 is then subjected to a suitable stress relief process, such as a bakeout at about 500 degrees F. for one hour.

Figure 12D:
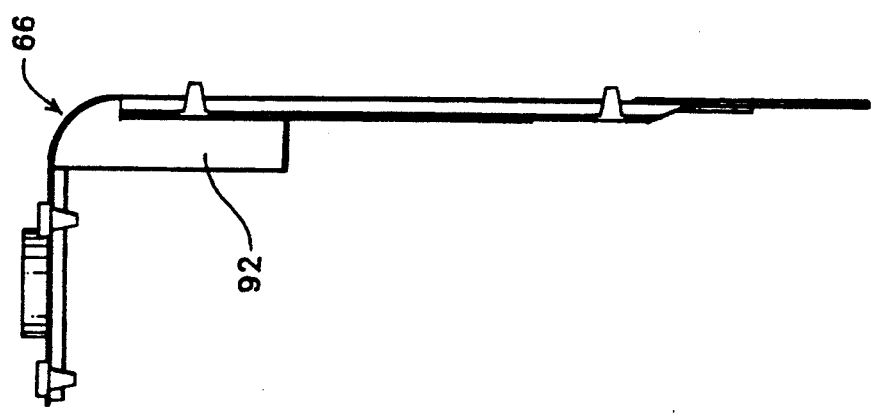
FIG. 12d is a diagrammatic side view in elevation of a reverse flange mounting structure having its leaf spring region bent around a forming mandrel during fabrication.

Positive or negative offset results from the tolerances arising from the bending of the leaf spring region illustrated in FIG. 12d and arises when the load beam 58 is actually loaded into proximity with the surface of the data storage disk. At that time, the offset characteristic becomes manifested. Offset tolerances can cause significant resonance vibrations to result in head positioner instability.

Figure 13A:
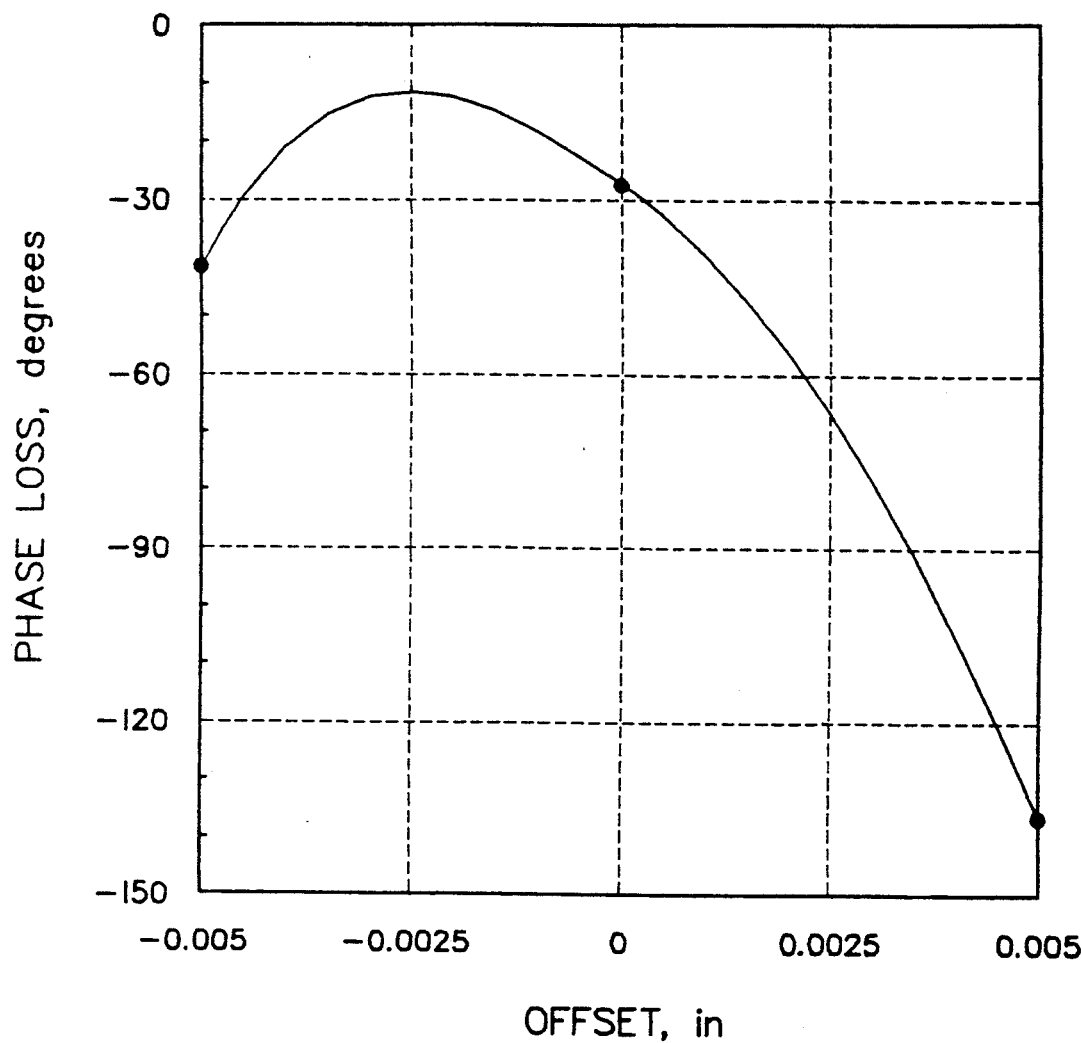
FIGS. 13a, 13b and 13c are three graphs respectively illustrating phase loss compared to offset for a 70% mocro-Whitney mounting structure, phase loss compared to offset for first torsion mode of a reverse flange mounting structure without cross bracing, and resonance amplitude compared to offset for first torsion mode of a reverse flange mounting structure.
Figure 13B:
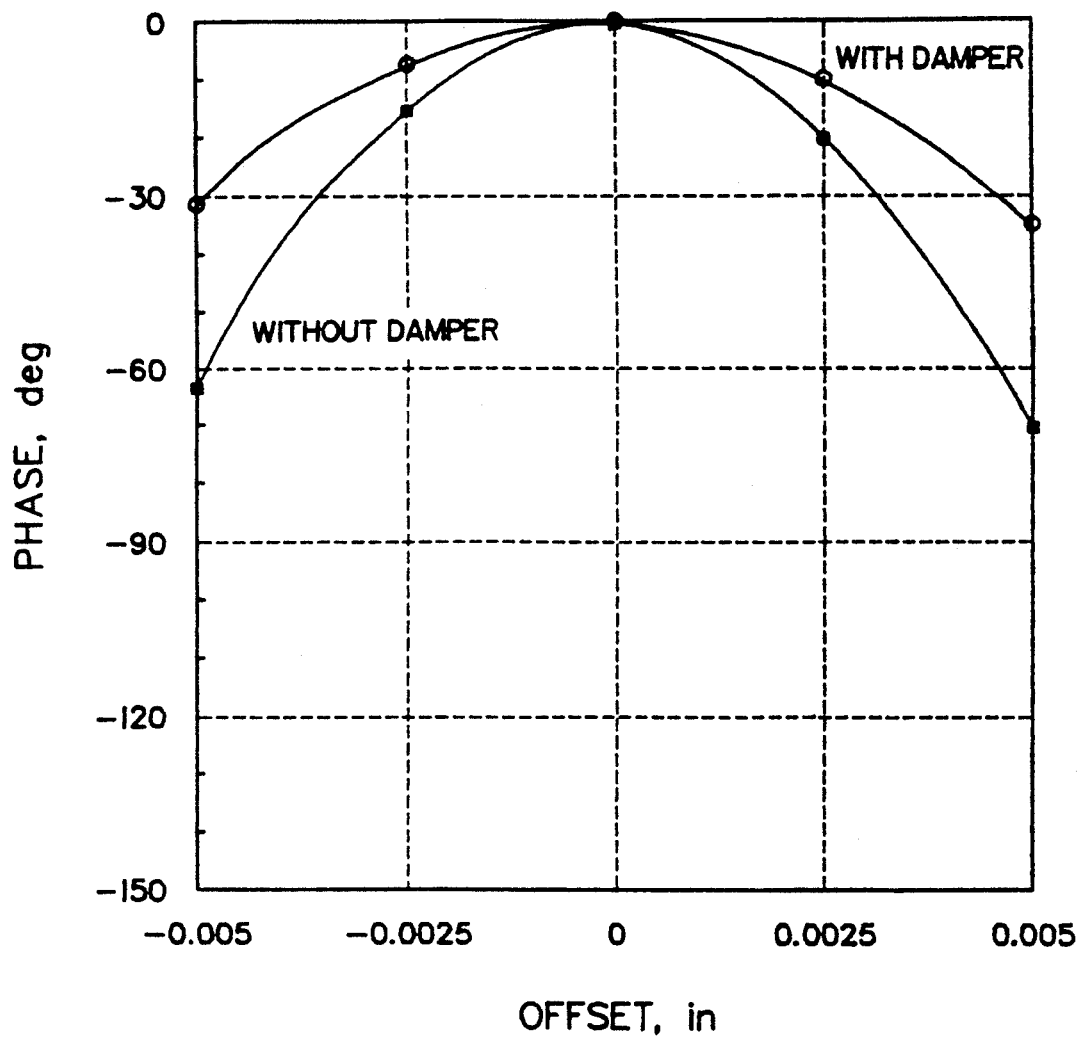
Figure 13C:
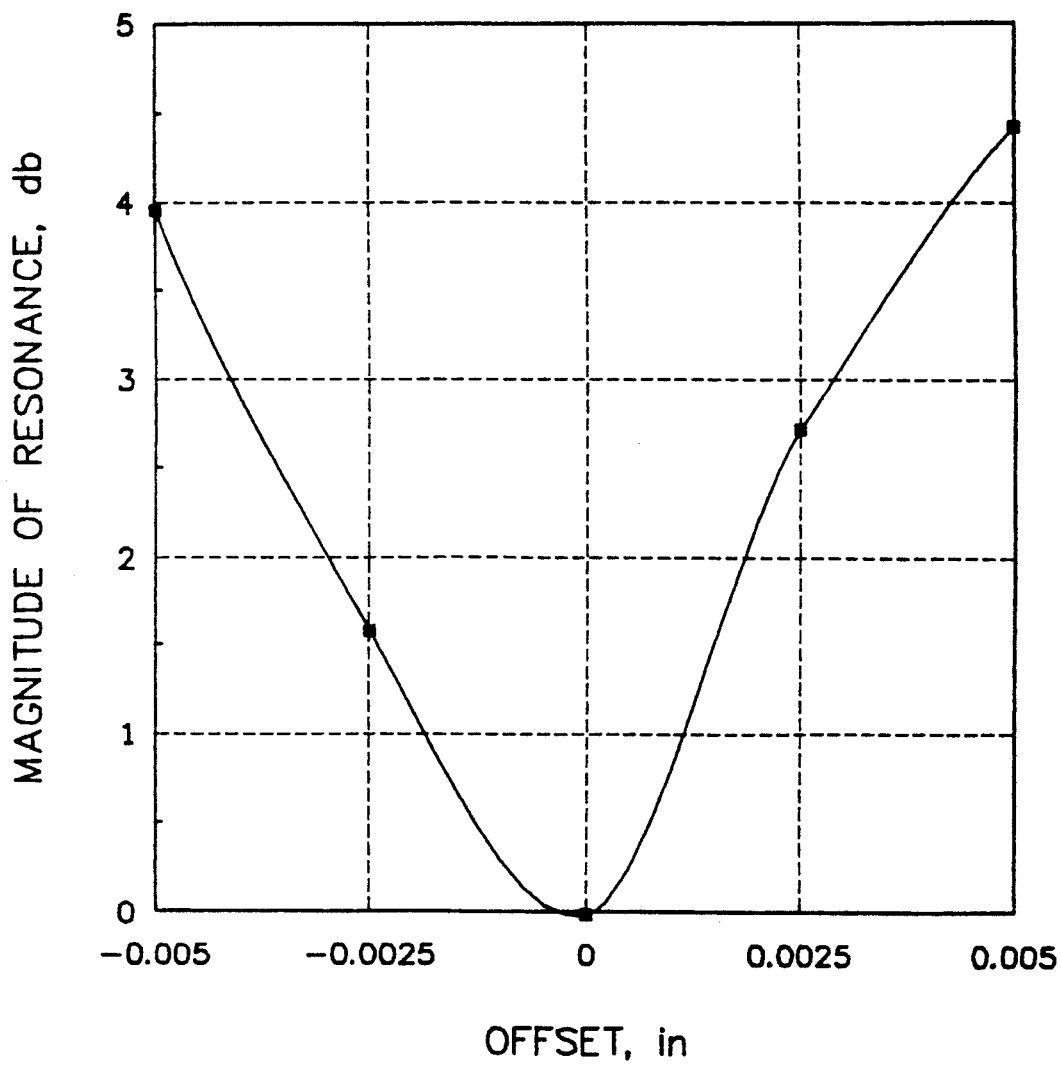

FIG. 13a graphs phase loss versus offset for a 70% size micro-Whitney load beam. Even at zero positional offset, the phase loss is about 25 degrees, and the characteristic is not linear with negative and positive offset. FIG. 13b graphs offset for a reverse flange load beam with and without a damper structure 74. It is readily apparent that there is no phase loss for either reverse flange load beam at zero offset., and that the offset varies substantially symmetrically for both positive and negative offsets. The damper structure 74 is seen to reduce phase loss by about one half over the undamped load beam structure. FIG. 13c illustrates resonant frequency amplitude versus offset for the first torsion vibrational mode of a reverse flange suspension without a cross brace. This graph shows a fairly symmetrical amplitude loss characteristic for both positive and negative offsets.

Figure 13D:
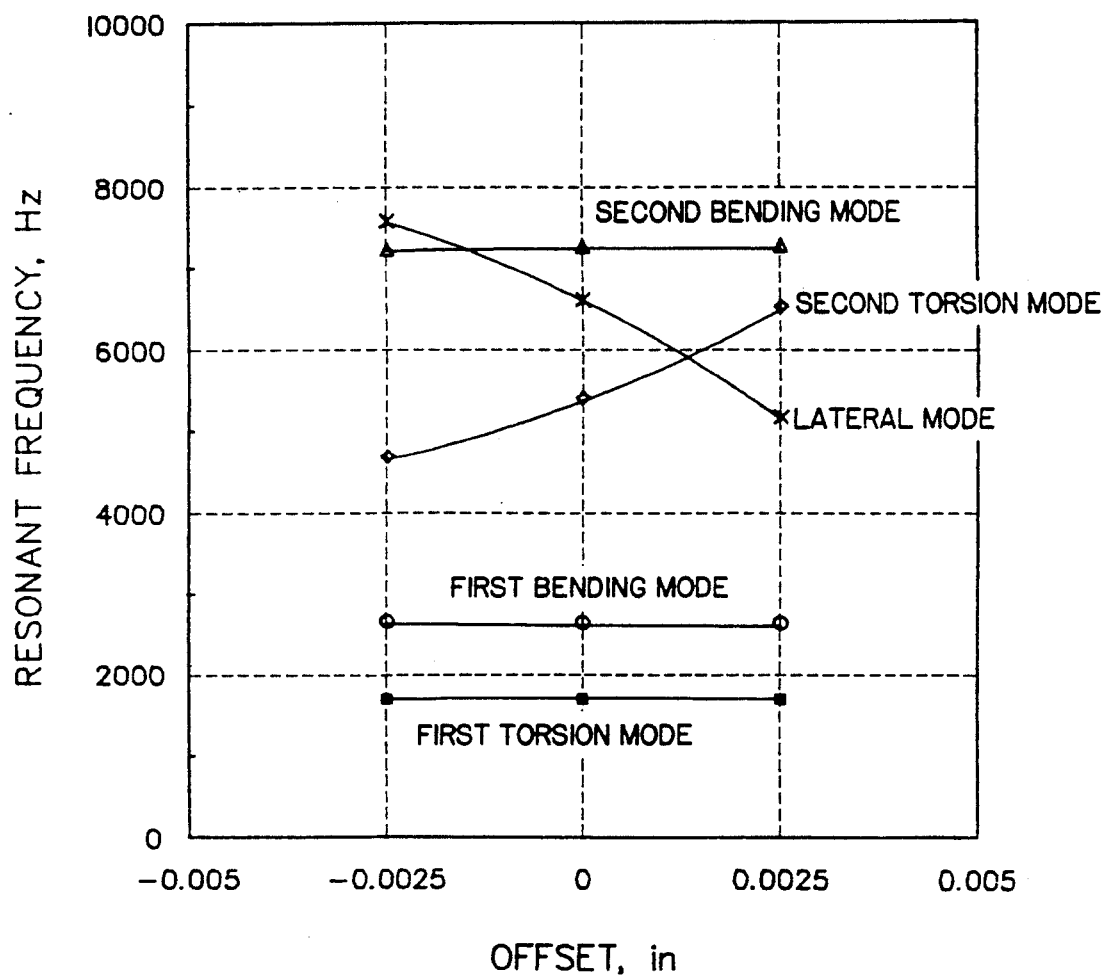
FIG. 13d is a graph comparing resonance frequencies of vibrational modes versus offset within a reverse flange mounting structure without cross-bracing.
Figure 13E:
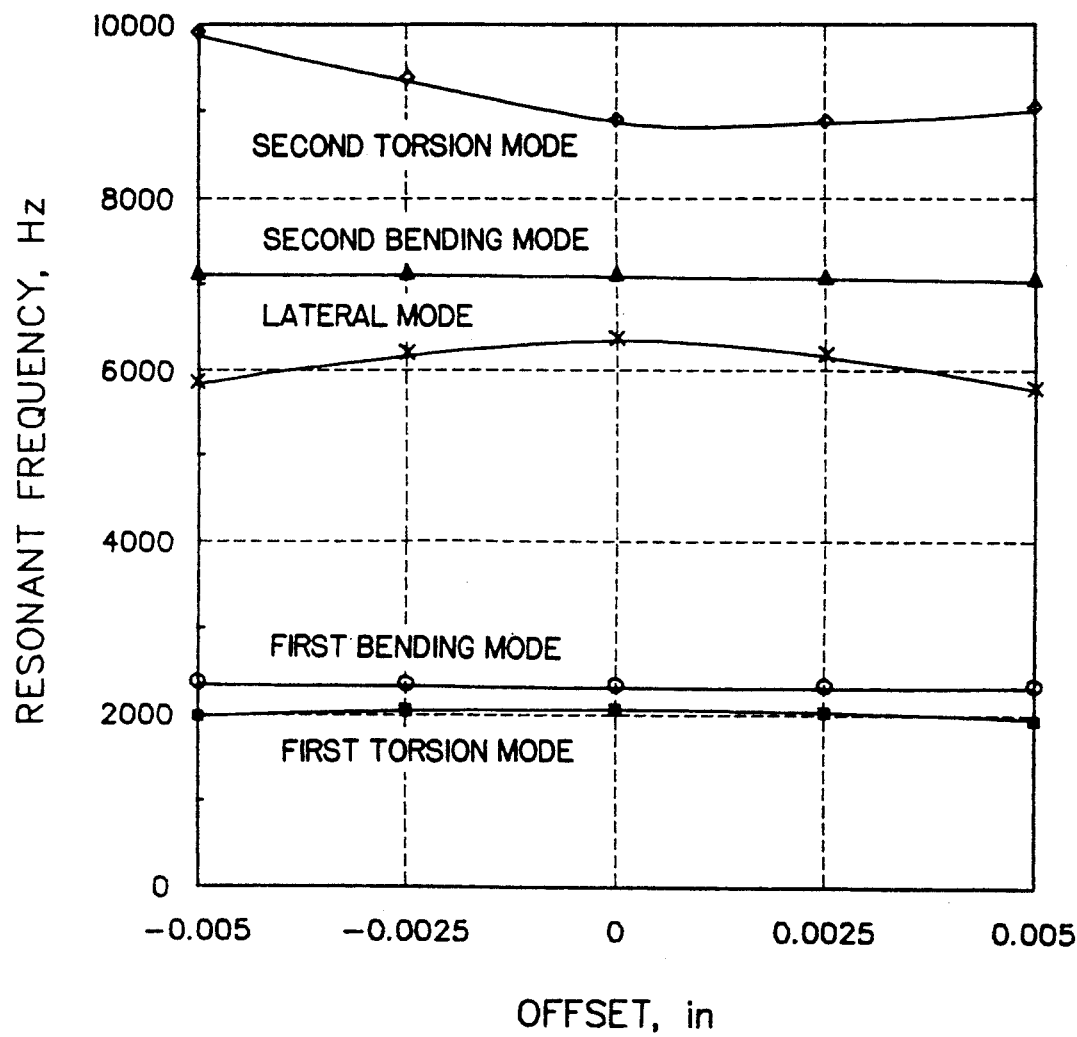
FIG. 13e is a graph comparing resonance frequencies of vibrational modes versus offset within a reverse flange mounting structure having cross-bracing.

FIG. 13d graphs resonant frequencies of the five vibrational modes as a function of offset in a reverse flange load beam not having a cross brace. It is seen that the somewhat critical second torsion mode and the very critical lateral mode resonances vary non-symmetrically with positive and negative offset of the load beam. Somewhat more symmetrical performance in the second torsional mode, and much more symmetrical performance in the lateral mode is achieved in a reverse flange load beam having cross bracing, as shown in FIG. 13e.

From the foregoing discussion, it will be apparent to those skilled in the art that load beam vibration mode resonances can be very sensitive to offset, whether the offset is positive or negative. In addition, if either a positive or negative offset exists, with the cross-bracing design as embodied in the preferred load beam 58, the first torsional mode resonance is increased by about 400 Hz and couples to the data transducer head 72 with a correctable phase shift. Adding a shortened lead spring with the cross brace further increases torsional mode resonance.

Having thus described an embodiment of the invention, it will now be appreciated by those skilled in the art that the objects of the invention have been fully achieved, and it will be understood by those skilled in the art that many changes in construction and widely differing embodiments and applications of the invention will suggest themselves without departure from the spirit and scope of the invention. The disclosures and the description herein are purely illustrative and are not intended to be in any sense limiting.

We claim:

1. A method for loading a head assembly into proximity with a storage surface fixed data disk during manufacture of a head and disk assembly of a fixed disk drive, the head assembly including a spindle means for rotating the fixed data disk and a mass balanced rotary voice coil actuator means for carrying at least one in-line load beam means, the method including the steps of:

forming said load beam means as an elongated unitary structure from metal sheet material so as to define: an actuator attachment end region for attachment to an outward end of the rotary actuator, a leaf spring loading region inwardly adjacent to the attachment end region, a gimbal mounting attachment region adjacent a head end region of the load beam for attachment of a gimbal mounting means and said head slider, a longitudinally reinforced loading tab means extending longitudinally from an end of the head end region, and a stiffened load beam region located between the leaf spring loading region and the loading tab means, attaching the gimbal mounting means to the gimbal mounting attachment region of the load beam means, attaching the slider to the gimbal mounting means, attaching the load beam to the rotary actuator means by securing the attachment end region to the outward end of the rotary actuator to form a rotary actuator assembly, positioning the rotary actuator assembly in operative proximity with the data storage disk within the head and disk assembly, positioning a loading map means within the head and disk assembly in proximity to an outer peripheral edge of the disk such that the loading tab means is engaged by the loading ramp means.

rotating the rotary actuator means to move the slider toward the disk during which movement the loading tab means follows the loading ramp means in order to guide the slider into a loaded position with respect to the disk, whereby the head is guided by cooperation of the loading tab and loading ramp into a loaded position with respect to the disk.

2. The method set forth in claim 1 comprising the further step of:

connecting the head to a plurality of wires and dressing the wires along a longitudinal edge of the load beam means.

3. The method set forth in claim 1 wherein the step of forming the load beam means so as to define a stiffened load beam region comprises the step of forming longitudinal, generally L-shaped edge flanges facing the disk surface.

4. The method set forth in claim 3 wherein the step of forming the load beam means so as to define a stiffened load beam region comprises the additional step of attaching a trussing means across the generally L-shaped edge flanges.

5. The method set forth in claim 1 wherein the step of forming the load beam means so as to define a leaf spring loading region comprises the step of forming two longitudinal segments defining an open central region along the leaf spring loading region.

6. The method set forth in claim 1 wherein the step of forming the load beam means so as to define a leaf spring loading region comprises the step of forming the leaf spring loading region to follow a predetermined radius of curvature in an unloaded orientation.

7. The method set forth in claim 1 comprising the step of forming the gimbal mounting means from a strip of sheet metal material so as to have an elongated body defining two outer leg regions, a central leg defining a generally hemispherical dimple, and two oppositely facing angled connecting web regions for connecting the central leg and outer end regions of the two outer leg regions.

8. The method set forth in claim 1 wherein the step of attaching the gimbal mounting means to the gimbal mounting attachment region of the load beam means comprises the step of spot welding the gimbal mounting means to the gimbal mounting attachment region.

9. The method set in forth in claim 1 comprising the further step of attaching vibration damping means to the load beam means.

10. A high capacity miniature fixed disk drive within a standardized micro-Winchester form factor comprising:

housing means defining a floor and contiguous integral sidewalls, cover means for enclosing the housing means and thereby defining a sealed internal ambient space, disk spindle means extending from the floor within the space, the disk spindle means including an in-hub direct drive brushless DC spindle motor means, at least six data storage disks mounted in stacked, spaced apart arrangement on the disk spindle means and rotated by the spindle motor means, the disks having a diameter not substantially greater than 95 millimeters, there being a space between oppositely facing data storage surfaces of adjacent disks having a height dimension not substantially greater than about one tenth of an inch, the data storage disks defining at least twelve data storage surfaces, the surfaces defining at least 50 megabytes of user data in a multiplicity of concentric data tracks and prerecorded with embedded sector head position servo information providing sector identification and track centering information;

mass balanced rotary voice coil actuator means mounted to the floor within the space and including at least seven aligned vertical head arms;

at least twelve elongated load beams, each load beam being attached to a said head arm to be in substantial in-line alignment therewith along a longitudinal axis, each load beam being formed so as to define:
a reinforced attachment end region for attachment to a said vertical head arm;
a leaf spring loading region adjacent to the attachment end region;
a gimbal flexure attachment region adjacent to a head end region,
a longitudinally reinforced loading tab region extending outwardly from the head end region for cooperating with a loading ramp means at least during disk drive assembly for loading a data transducer head slider into proximity with an adjacent data surface of a said disk, and
a reinforced load beam region between the leaf spring region and the head end region and comprising longitudinal reverse flange peripheral edge portions for stiffening said load beam region in a direction along the longitudinal axis;

gimbal flexure means attached to the load beam means at the gimbal flexure attachment region;

the data transducer head slider being attached to the gimbal flexure means and including plural electrical connections to a data transducer head defined thereon;

head conductor wire means connected to the plural electrical connections and dressed along one of said reverse flange peripheral edge portions; and, drive electronics means being connected to said spindle motor means, said actuator means and each said data transducer head, the housing defining a loading ramp region for placement of said loading ramp means in cooperation with said loading tab regions to facilitate loading said head sliders relative to respective adjacent data storage surfaces, at least during initial assembly of said disk drive.

11. The high capacity miniature fixed disk drive set forth in claim 10 wherein the number of disks is seven, the number of data storage surfaces and load beam means is fourteen, and the number of head arms is eight.

12. The high capacity miniature fixed disk drive set forth in claim 10 wherein the number of disks is eight, the number of data storage surfaces and load beam means is sixteen, and the number of head arms is nine.

* * * * *